(12) United States Patent
Nakao

(10) Patent No.: US 7,813,915 B2
(45) Date of Patent: *Oct. 12, 2010

(54) APPARATUS FOR READING A PLURALITY OF DOCUMENTS AND A METHOD THEREOF

(75) Inventor: Yoshio Nakao, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1715 days.

This patent is subject to a terminal disclaimer.

(21) Appl. No.: 09/862,437

(22) Filed: May 23, 2001

(65) Prior Publication Data

US 2002/0052730 A1 May 2, 2002

(30) Foreign Application Priority Data

Sep. 25, 2000 (JP) ............... 2000-290886

(51) Int. Cl.
G06F 17/30 (2006.01)
G06F 17/28 (2006.01)
G06F 17/21 (2006.01)

(52) U.S. Cl. .............. 704/9; 704/7; 704/8; 704/10; 715/254; 707/778

(58) Field of Classification Search .......... 704/9, 704/277, 7, 8, 10, 1; 707/101, 102, 511, 707/513, 778; 715/530, 531, 254
See application file for complete search history.

(56) References Cited

U.S. PATENT DOCUMENTS

| | | | | |
|---|---|---|---|---|
| 5,384,703 A | * | 1/1995 | Withgott et al. | 715/531 |
| 5,659,742 A | * | 8/1997 | Beattie et al. | 707/104.1 |
| 5,768,580 A | * | 6/1998 | Wical | 707/102 |
| 5,960,383 A | * | 9/1999 | Fleischer | 715/530 |
| 6,537,325 B1 | * | 3/2003 | Nishizawa | 715/530 |
| 6,560,620 B1 | * | 5/2003 | Ching | 715/511 |
| 6,772,165 B2 | * | 8/2004 | O'Carroll | 707/101 |
| 6,810,376 B1 | * | 10/2004 | Guan et al. | 704/9 |

FOREIGN PATENT DOCUMENTS

| | | |
|---|---|---|
| JP | 7-325827 | 12/1995 |
| JP | 11-39334 | 2/1999 |
| JP | 11-272699 | 10/1999 |
| JP | 2000-57152 | 2/2000 |

OTHER PUBLICATIONS

Jane Morris and Graeme Hirstt, Lexical cohesion computed by thesaural relations as an indicator of the structure of text, 1991, Computational Linguistics, vol. 17, pp. 21-48.*

(Continued)

*Primary Examiner*—David R Hudspeth
*Assistant Examiner*—Abdelali Serrou
(74) *Attorney, Agent, or Firm*—Staas & Halsey LLP

(57) ABSTRACT

For each of a plurality of documents the thematic hierarchies are recognized, and a topic that commonly appears on the plurality of documents is extracted based on the recognized thematic hierarchies. Then, the description parts corresponding to the extracted topics are taken out from each document and the taken-out parts are outputted as related passages.

11 Claims, 41 Drawing Sheets

OTHER PUBLICATIONS

M. Amini, "Interactive Learning for Text Summarization", Proceedings of the PKDD 2000 Workshop on Machine Learning and Textual Information Access, 2000, pp. 44-52.*

R. Barzillay and M. Elhadad, "Using Lexical Chains for Text Summarization", In Proceedings of the Intelligent Scalable Text Summarization Workshop (ISTS '97), ACL, Madrid, Spain, 1997, pp. 10-17.*

W. Chuang and J. Yang, "Extracting Sentence Segments for Text Summarization: A Machine Learning Approach", Special Interest Group on Information Retrieval (SIGIR '00), 2000, pp. 152-159.*

D. Radev, S. Blair-Goldensohn and S. Zhang, "Experiments in Single and Multi-Document Summarization Using MEAD", Proc. Document Understanding Conference, 2001, pp. 1-8.*

Christine M. Neuwirth, et al., "The Role of External Representations in the Writing Process: Implications for the Design of Hypertext-based Writing Tools" in Proc. Of Hypertext '89, pp. 319-341, The Association for Computing Machinery.

Nobuyuki Omori, et al., "Hypertext Generation from Related Manuals using tfidf Method" IPSJ SIG Notes, vol. 97, No. 86, Information Processing Society of Japan, pp. 111-118, 1997.

Gerard Salton, et al. "Automatic Text Decomposition Using Text Segments and Text Themes", In Process of Hypertext '96, pp. 53-65, the Association for Computing Machinery.

Inderjeet Mani, et al., "Summarizing Similarities and Differences Among Related Documents", chapter 23, pp. 357-379, The MIT Press, London, 1999.

Amit Singhal, et al., "Pivoted Documents Length Normalization", in Proceedings of the 19th Annual International ACM-SIGIR Conference on Research and Development in Information Retrieval, pp. 21-29, The Association for Computing Machinery, 1996.

James P. Callan, "Passage-Level Evidence in Document Retrieval", in Proceedings of the $17^{th}$ Annual International ACM-SIGIR Conference on Research and Development in Information Retrieval, pp. 302-310, The Association for Computing Machinery, 1994.

Eugene Charniak, "Hidden Markov Models and Two Applications" in Statistical Language Learning, ch. 3, pp. 39-52, The MIT Press, 1996.

Masaaki Nagata, "A Stochastic Japanese Morphological Analyzer Using a Forward-DP Backward-A N-Best Search Algorithm", in Proc. Of COLING '94, pp. 201-207.

* cited by examiner

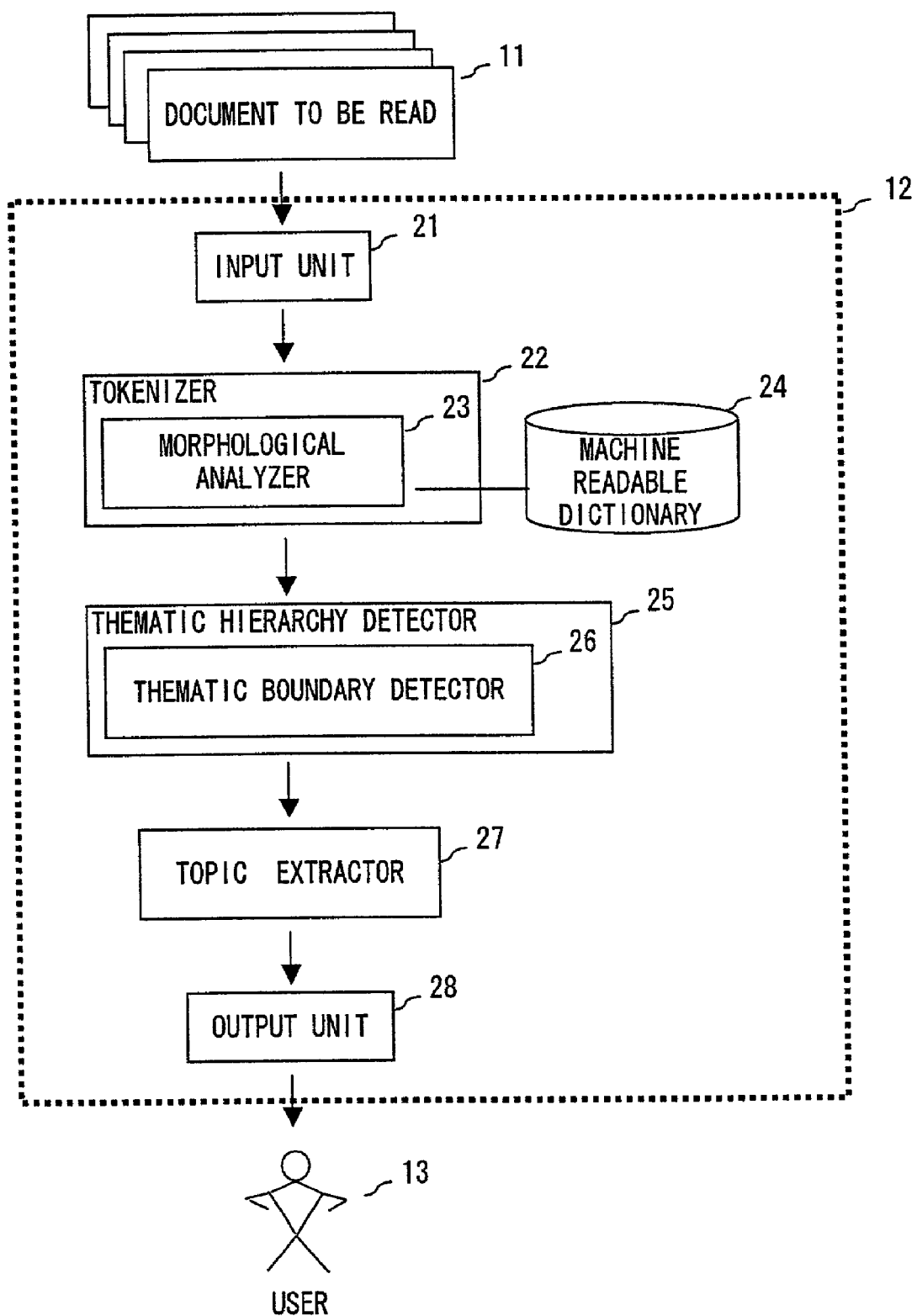
F I G. 2

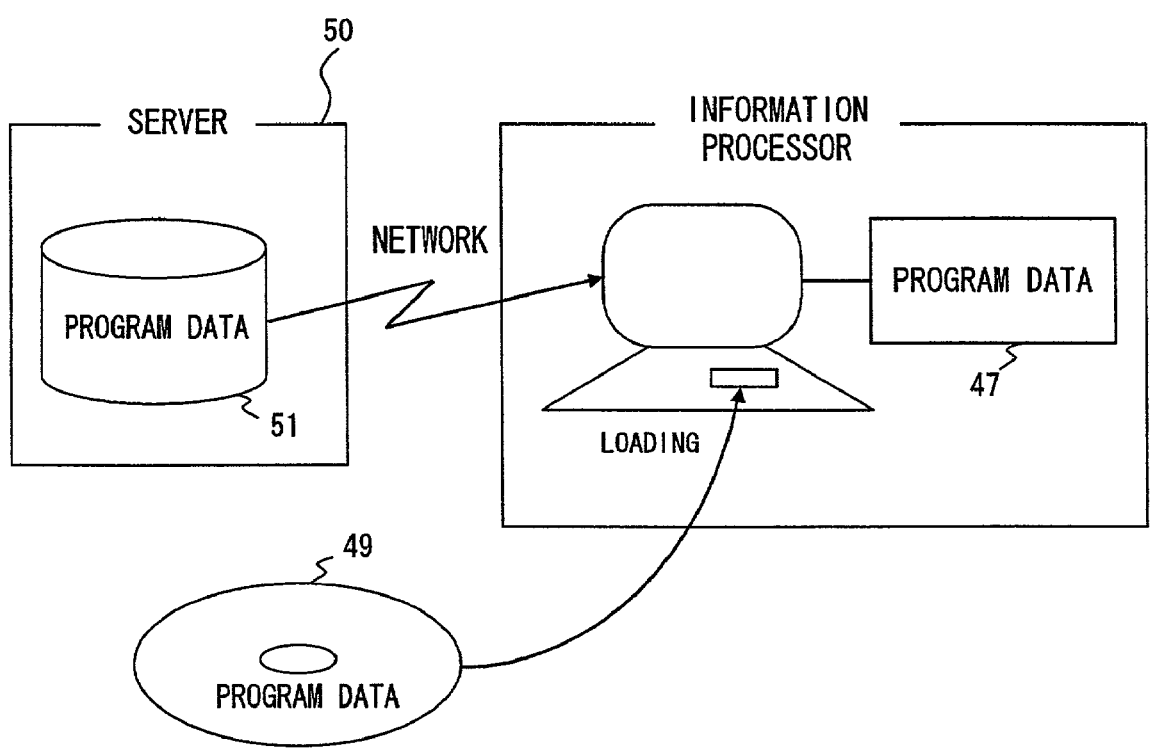
F I G. 4

| | | |
|---|---|---|
| INPUT SENTENCE | 東京都は大都市だ | |
| | HEADWORD (STEM OF WORD) | PART OF SPEECH |
| | 東 | NOUN |
| | 東京都 | NOUN |
| | 京都 | NOUN |
| CANDIDATE WORD | は | PARTICLE [は] |
| | 大 | PREFIX |
| | 都市 | NOUN |
| | だ | AUXILIARY VERB [だ] |

F I G. 9

INPUT SENTENCE: Tokyo is the Japanese capital.

CANDIDATE WORD:

| headword | base(root) form | part of speech |
|---|---|---|
| Tokyo | Tokyo | proper noun |
| is | be | be verb (the third person singular present form) |
| the | the | definite article |
| Japanese | Japanese | proper noun |
| Japanese | Japanese | adjective |
| capital | capital | noun |

FIG. 10

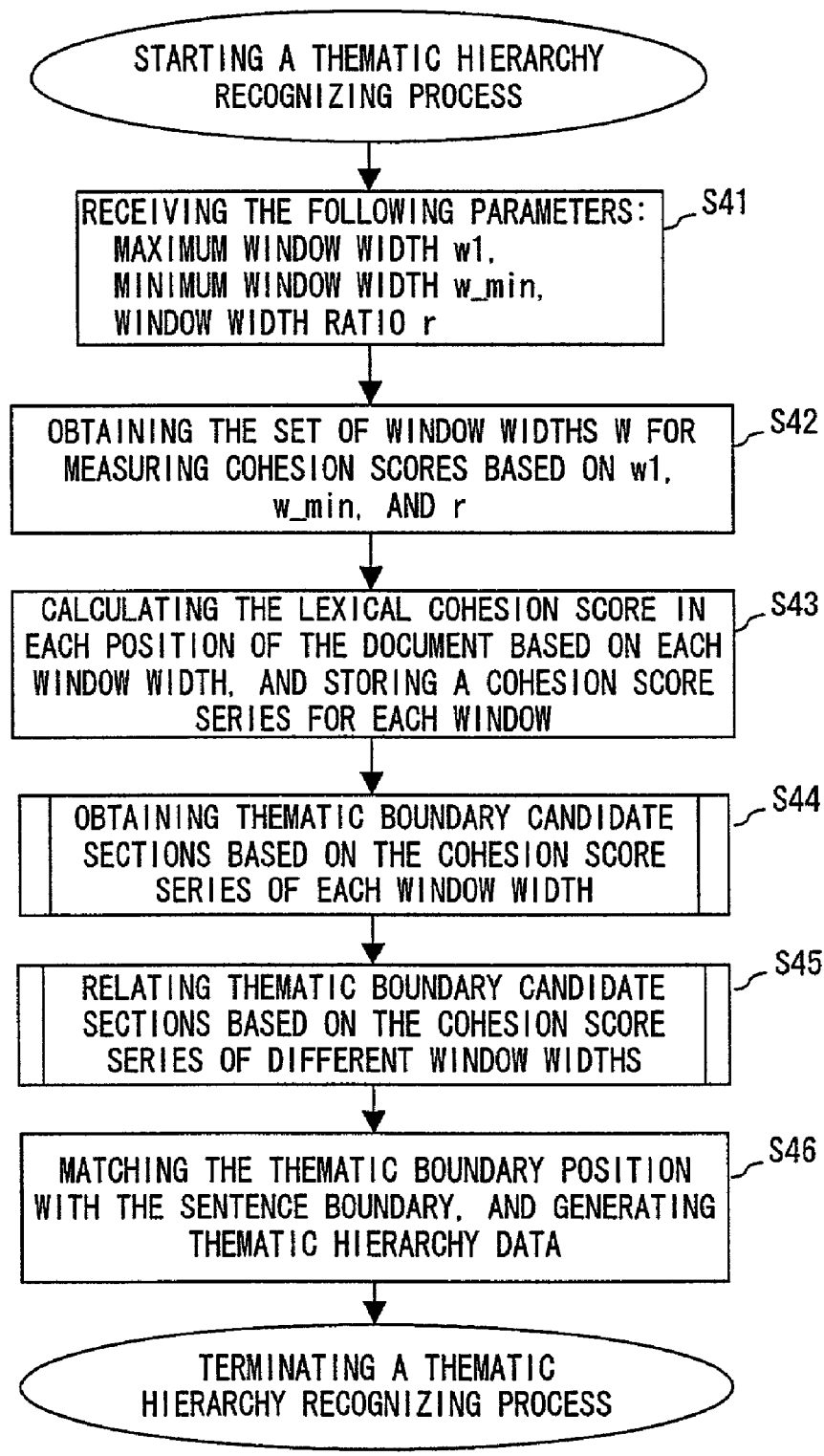
F I G. 1 1

| NUMBER OF TERMS | | NUMBER OF AVERAGED COHESION SCORE RELATED TO THE DOCUMENT AREA | | | | | | | | | | |
|---|---|---|---|---|---|---|---|---|---|---|---|---|
| | | a1 | a2 | a3 | a4 | a5 | a6 | a7 | a8 | a9 | a10 | a11 |
| 4-TERM AVERAGE (c1~c4) | LEFT WINDOW | 1 | 2 | 3 | 4 | 3 | 2 | 1 | 0 | 0 | 0 | 0 |
| | RIGHT WINDOW | 0 | 0 | 0 | 0 | 1 | 2 | 3 | 4 | 3 | 2 | 1 |
| 3-TERM AVERAGE (c1~c3) | LEFT WINDOW | 1 | 2 | 3 | 3 | 2 | 1 | 0 | 0 | 0 | 0 | |
| | RIGHT WINDOW | 0 | 0 | 0 | 0 | 1 | 2 | 3 | 3 | 2 | 1 | |
| 2-TERM AVERAGE (c1, c2) | LEFT WINDOW | 1 | 2 | 2 | 2 | 1 | 0 | 0 | 0 | 0 | | |
| | RIGHT WINDOW | 0 | 0 | 0 | 0 | 1 | 2 | 2 | 2 | 1 | | |

FIG. 14

| ○水島広子君 [9-10] | ○内閣総理大臣（森喜朗君）[4-5] |
|---|---|
| ¶9 総理御自身も触れられている大人社会のあり方ですが、これが子供たちに大きな影響を与えるのは事実だと思います。子供たちは大人のまねをして成長します。大人社会のモラルがこれほど低下した今の日本で、子供たちのモラルだけが高まったら、むしろおかしなことだと思います。モラルの低下の一つの例として、子供の目に触れるテレビや雑誌、ゲームなどの影響も無視できません。だれでも簡単に目にするメディアに暴力や性暴力がはんらんし、町じゅうに売春情報があふれているというのが今の大人の社会です。子供たちを批判する前に、総理御自身も含めて、私たち大人がまず反省すべきではないでしょうか。 | ¶4 テレビや雑誌、ゲームなどの青少年を取り巻く環境について、暴力や性犯罪がはんらんしており、青少年にとって大きな問題であるとの御指摘でありますが、これらの問題は、申すまでもなく大人社会の責任であります。青少年を取り巻く社会環境の改善のため、社会が一体となった取り組みを進めることが極めて重要であると考えております。 |
| ¶10 子供たちの問題行動とメディアによる有害情報の関係を指摘する専門家はたくさんいます。仮に犯罪に直結しなくても、幼いころから有害情報に当たり前のように触れることが子供たちの精神面の発育に及ぼす影響は無視できません。諸外国でも進められているように、子供たちを有害な情報から守る法律を日本でも早急につくる必要があると思います。これはもちろん、国家による検閲というような形をとるべきではありません。例えば、子供にとって有害な情報であるか否かを親が判断して選べるようなシステム、また、町中でも子供が有害情報に触れるのを防ぐような社会的なバリアをつくるなど、地域社会の大人たちが子供たちを守るようなシステムをつくるべきだと思います。子供を有害情報から守るための立法の必要性について、森総理はいかがお考えでしょうか。 | ¶5 また、子供たちを有害情報から守るための法律の早急な制定を促す御意見をいただきました。私は、かねてから、少年非行対策は与野党対立案件にあらずと考えておりますが、御指摘の点については、まさに議員と意見を一にするものであります。しかしながら、この種法律の制定につきましては、青少年をめぐる環境の浄化の基本的なあり方や表現の自由とのかかわりなど、国民的な合意の形成が必要であると考えられ、関係方面の幅広い議論を重ねていきたいと考えております。 |

FIG. 25

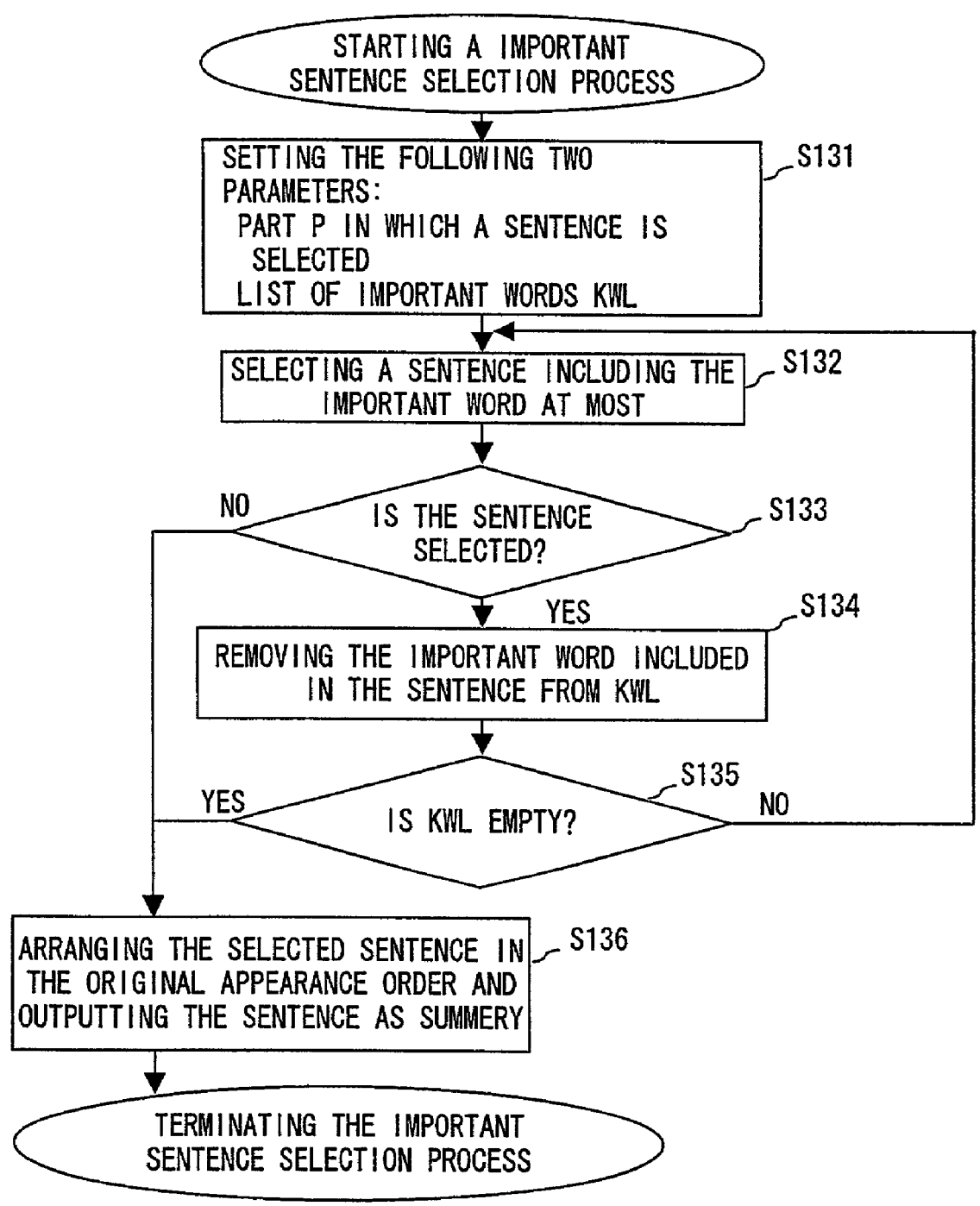
F I G. 27

| ○水島広子君 [2-3]<br>…精神科医として現場で子供たちや親たちと向き合ってきた私の目には、総理のおっしゃるような教育改革で問題が解決できるとはとても思えません。…いじめの問題を根本的に解決するには、人間の多様性を尊重して、自分も他人も大切にできる子供を育てる教育が不可欠です。…教育基本法の見直しにしても、本来、他者との触れ合いを通して自発的に育てるはずの奉仕の精神や道徳心といったものを法改正によって一方的に押しつけようとするのであれば、逆効果となり、取り返しがつかないことになると思います。… | ○内閣総理大臣（森喜朗君）[1-2]<br>…いじめについてのお尋ねでありますが、いじめ問題を解決するためには、弱い者をいじめることは人間として絶対に許されないとの認識のもと、奉仕活動や自然体験活動などを通じて、子供たちに、命を大切にし、他人を思いやる心など、基本的な倫理観をはぐくむことが重要であると考えております。…教育基本法についてのお尋ねでありますが、教育基本法は、制定以来半世紀を経ております。…今後、教育改革国民会議において、例えば我が国の文化や伝統を尊重する気持ちを養う観点や生涯学習時代を迎える観点、あるいは教育において家庭や地域が果たすべき役割といった観点を初め、さまざまな観点から幅広く議論を進めていただきたいと考えております。民法改正についてのお尋ねがありました。 |
|---|---|
| ○水島広子君 [4-8]<br>…夫婦は皆同じ名字にするというのは、明治維新に西洋のまねをして導入された制度であり、日本独自の伝統とは何ら関係がありません。…男女共同参画社会の実現を所信表明演説でもうたわれた総理は、希望する夫婦には夫婦別姓を認めるよう民法を直ちに改正することについて、どのようにお考えでしょうか、お尋ねいたします。…非嫡出子は、法律上相続のときに差別を受けるだけではなく、普通に社会生活を送る上でも、就職や結婚の際に差別を受けています。… | ○内閣総理大臣（森喜朗君）[3]<br>…この導入についてのお話でありますが、これは婚姻制度や家族のあり方とも関連する重要な問題でありまして、国民や関係各方面の意見が現在分かれている状況にありますので、国民各層の御意見を幅広く聞き、また、各方面における議論の推移も踏まえながら、適切に対処していく必要があるのではないかと考えております。また、嫡出でない子の法定相続分等についてでありますが、民法上、嫡出でない子と嫡出である子の相続分に差異が設けられている点の解消につきましても、選択的夫婦別氏の問題と同様に、国民や関係各方面の意見が分かれている状況にありますので、国民各界各層の御意見をこれも幅広く聞くなどいたしまして、適切に対処していく必要があると考えております。 |

FIG. 28

| ○水島広子君 [9-10] | ○内閣総理大臣（森喜朗君）[4-5] |
|---|---|
| ¶⁹ 総理御自身も触れられている大人社会のあり方ですが、これが子供たちに大きな影響を与えるのは事実だと思います。…モラルの低下の一つの例として、子供の目に触れるテレビや雑誌、ゲームなどの影響も無視できません。だれでも簡単に目にするメディアに暴力や性暴力がはんらんし、町じゅうに売春情報があふれているというのが今の大人の社会です。… | ¶⁴ テレビや雑誌、ゲームなどの青少年を取り巻く環境について、暴力や性犯罪がはんらんしており、青少年にとって大きな問題であるとの御指摘でありますが、これらの問題は、申すまでもなく大人社会の責任であります。… |
| ¶¹⁰ …諸外国でも進められているように、子供たちを有害な情報から守る法律を日本でも早急につくる必要があると思います。… | ¶⁵ また、子供たちを有害情報から守るための法律の早急な制定を促す御意見をいただきました。… |

FIG. 29

| ○水島広子君 [12]<br>…しかし、最近の国会運営を見て、民主主義とは話し合いよりも多数決で押し切ることだという誤った理解をしている人たちがふえているように思います。…まずは党首討論を毎週行うことで総理みずから模範を示されるべきだと思いますし、あわせて、各大臣についても同様な場を設けるべきだと思いますが、総理のお考えをお願いいたします。 | ○内閣総理大臣（森喜朗君）[6]<br>…積極的に議論を闘わせることは、最終的には多数決で決するにせよ、国民の前に争点を明らかにし、国民の政治への関心を高めるために重要なことであると考えます。お尋ねの党首討論のあり方などの国会の運営に関する問題につきましては、国会において御議論をいただきたいと考えます。 |
|---|---|
| ○水島広子君 [13-14]<br>…小児科救急の不備のために命を落とした不幸な子供の例も多数報道されています。また、心を病む子供に対しては、大人を中心とした医療体系では対応し切れません。小児の医療は、国の将来を担う貴重な人材を社会全体で守るという発想で行わなければいけないと思います。国が特別な予算枠を確保し良質な医療を提供すること、また、数少ない小児科医を効率的に活用するためにも、各都道府県に子供病院をつくり、人材を集中させ、包括的、専門的な子供医療ができるように国としても取り組むべきだと思いますが、いかがでしょうか。現行のように各都道府県の自助努力に任せていると、いまだに全国で十九都道府県にしか子供の総合医療施設がありません。… | ○内閣総理大臣（森喜朗君）[7]<br>…このため、小児専門の救急医療体制の整備、診療報酬における小児医療の適切な評価、小児医療施設の整備の補助などを行っているところでありますが、今後とも適切な対応をしていきたいと考えております。… |

| ○内閣総理大臣（森喜朗君）[22-24] | ○水島広子君 [1-3] | ○土井たか子君 [17-22] |
|---|---|---|
| 日本新生プランの第三の柱は、教育の新生、すなわち教育改革であります。悪質な少年犯罪の続発や不登校、学級崩壊などの深刻化は、まことに心痛むものがあります。…命を大切にし、他人を思いやる心、奉仕の精神、日本の文化、伝統を尊重し、国や地域を愛する気持ちをはぐくみ、二十一世紀の日本を支える子供たちが、創造性豊かな立派な人間として成長することこそが、心の豊かな美しい国家の礎と言えるのではないでしょうか。私は、かねてから体育、徳育、知育のバランスのとれた全人教育を充実するとともに、世界に通用する技術、能力を備えた人材を育成するため、世界トップレベルの教育水準の確保が必要であると考えてきました。阪神・淡路大震災やナホトカ号重油流出事故のとき、全国津々浦々から若者たちが集まり、献身的にボランティア活動をしていた姿を見て、さすが日本の若者と感動したことを思い出します。…また、制定して半世紀となる教育基本法についても、抜本的に見直す必要があると考えております。教育改革国民会議においても、九月の中間報告に向けて、我が国の教育各般にわたり議論が行われているところであります。私は、学校の運営体制を整備するとともに、教師が、人間が人間を教えるというとうとい使命感に燃えて教育に携わることが何よりも大切であり、ＩＴ教育や中高一貫の教育の推進、大学九月入学の推進、教員や学校の評価システムの導入、教育委員会のあり方なども重要な課題であると考えております。 | …少年犯罪についても、加害者に対する更生システムを専門化し徹底すると同時に、被害者のケアを充実するといった課題に目を向けずに、少年法を改正することで安易に厳罰化を図ろうとするような政治の姿勢には大きな危惧を抱いております。総理は、所信表明演説の中で教育の新生について述べておられました。しかし、その具体的内容を見ると、余りにも形式的、表面的なことばかりに思え、今子供たちの教育の場に最も必要とされている視点が欠けているように思えてなりません。…いじめの問題を根本的に解決するには、人間の多様性を尊重して、自分も他人も大切にできる子供を育てる教育が不可欠です。…教育基本法の見直しにしても、本来、他者との触れ合いを通して自発的に育てるはずの奉仕の精神や道徳心といったものを法改正によって一方的に押しつけようとするのであれば、逆効果となり、取り返しがつかないことになると思います。… | …まさに全国民的な課題と言ってよいでしょう。…むしろ、教育基本法改正や少年法改正の論議に深く踏み込むことによって問題は放置されてしまうと思えてなりません。…子供たちの荒れるのも、クラスの崩壊も、暴力も、子供たちが人間として尊重されていないところから始まっているように私には思えます。自分自身の命と人生を何よりも尊重され、大切に思える子供は、他人の命と人生も尊重し、大切にするものです。…奉仕活動を学校で強制するなど、無意味どころか反発を呼んで逆効果であろうと私は思います。…ボランティアの強制など、言葉の矛盾であるばかりでなく、ようやく日本にも育ちつつある若者たちの本来のボランティア精神をも押し殺してしまうことになるでしょう。…総理、あなたは所信表明で、教育基本法を抜本的に見直す必要を言われました。…教育基本法の改正を提起しようとしている教育改革国民会議についてもお尋ねいたします。… |

FIG. 33

I. Getting the World Economy on Track for Sustained Growth

4. Since we met last year in Birmingham, the world economy has faced major challenges. Progress has been achieved in addressing the crisis and laying the foundations for recovery. Policy steps aimed at supporting growth in the major industrialized countries and important policy actions leading to stronger performance in some emerging markets have improved the economic outlook. A number of substantial challenges still remain. We therefore renew our commitment to pursue appropriate macroeconomic policies and structural reforms. These will contribute to more balanced growth in the world economy, thereby reducing external imbalances.

FIG. 35

I. Getting[getting] the World[world] Economy[economy] on Track[track] for Sustained[sustained] Growth[growth]

4. Since we met[met] last year in Birmingham[birmingham], the world[world] economy[economy] has faced[faced] major[major] challenges[challenges]. Progress[progress] has been achieved[achieved] in addressing[addressing] the crisis[crisis] and laying[laying] the foundations[foundations] for recovery[recovery]. Policy[policy] steps[steps] aimed[aimed] at supporting[supporting] growth[growth] in the major[major] industrialized[industrialized] countries[countries] and important policy[policy] actions[actions] leading[leading] to stronger[stronger] performance[performance] in some emerging[emerging] markets[markets] have improved[improved] the economic[economic] outlook[outlook]. A number of substantial[substantial] challenges[challenges] still remain[remain]. We therefore renew[renew] our commitment[commitment] to pursue[pursue] appropriate[appropriate] macroeconomic[macroeconomic] policies[policies] and structural[structural] reforms[reforms]. These will contribute[contribute] to more balanced[balanced] growth[growth] in the world[world] economy[economy], thereby[thereby] reducing[reducing] external[external] imbalances[imbalances].

FIG. 36 about, across, again, against, all, along, already, also, among, an, and, another, are, area, areas, around, as, asked, asking, at, back, be, because, been, before, behind, being, best, better, between, both, but, by, can, certain, clearly, come, different, do, during, each, early, end, enough, even, every, everyone, face, fact, few, first, for, from, fully, further, general, gets, give, given, go, good, goods, greater, groups, has, have, having, high, higher, how, if, important, in, interest, interesting, interests, into, is, it, its, keep, know, last, later, least, less, longer, made, make, many, member, members, more, most, much, must, necessary, need, needed, needs, new, next, no, not, now, number, of, older, on, once, one, only, open, opens, order, other, others, our, out, over, part, place, point, points, possible, present, presented, problem, problems, put, right, same, shall, should, shows, since, small, so, some, states, still, such, take, taken, than, that, the, their, them, then, there, therefore, these, they, this, those, three, through, thus, to, together, too, toward, two, under, up, upon, us, use, was, way, ways, we, well, what, when, where, which, while, who, will, with, within, without, work, working, works, would, year, years, yet, young

FIG. 37

| KÖLN 1999 [1] | OKINAWA 2000 [1] |
|---|---|
| ... Progress has been achieved in addressing the crisis and laying the foundations for recovery. ... The world economy is still feeling the effects of the financial crises that started in Asia two years ago. ... | ... Yet the financial and economic crises of the past few years have presented enormous challenges for the world economy. Together with many of our partners around the world, we have devoted ourselves to alleviating the adverse effects of the crisis, stimulating economic recovery, and identifying ways to help prevent future upheavals, including measures to strengthen the international financial architecture. ... |

FIG. 39

| KÖLN 1999 [3] | OKINAWA 2000 [12-13] |
|---|---|
| II. Building a World Trading System That Works for Everyone The multilateral trading system incorporated in the World Trade Organization (WTO) has been key to promoting international trade and investment and to increasing economic growth, employment and social progress. ... Given the WTO's vital role, we agree on the importance of improving its transparency to make it more responsive to civil society while preserving its government-to-government nature. ... We therefore call on all nations to launch at the WTO Ministerial Conference in Seattle in December 1999 a new round of broad-based and ambitious negotiations with the aim of achieving substantial and manageable results. ... In this context we reaffirm our commitment made in Birmingham last year to the least developed countries on improved market access. We also urge greater cooperation and policy coherence among international financial, economic, labor and environmental organizations. ... | ... The adoption of the short-term package in Geneva, regarding implementation of Uruguay Round undertakings, increased market access for the LDCs, technical assistance for enhanced capacity building)as well as improvement in WTO transparency, was an important first step in this direction and must be pursued expeditiously. ... We must ensure that the multilateral trading system is strengthened and continues to play its vital role in the world economy. ... We agree that the objective of such negotiations should be to enhance market access, develop and strengthen WTO rules and disciplines, support developing countries in achieving economic growth and integration into the global trading system, and ensure that trade and social policies, and trade and environmental policies are compatible and mutually supportive. ... In this regard, international and domestic policy coherence should be enhanced, and co-operation between the international institutions should be improved. ... |

F I G. 40

| KÖLN 1999 [9] | OKINAWA 2000 [5] |
|---|---|
| ... We also welcome the increasing cooperation between the ILO and the IFIs in promoting adequate social protection and core labor standards. ... In addition, we stress the importance of effective cooperation between the WTO and the ILO on the social dimensions of globalization and trade liberalization. | ... We also welcome the increasing co-operation between the International Labour Organisation (ILO) and the International Financial Institutions (IFIs) in promoting adequate social protection and core labour standards. ... In addition, we stress the importance of effective co-operation between the World Trade Organisation (WTO) and the ILO on the social dimensions of globalisation and trade liberalisation. ... |

F I G. 41

APPARATUS FOR READING A PLURALITY OF DOCUMENTS AND A METHOD THEREOF

BACKGROUND OF THE INVENTION

1. Field of the Invention

The present invention relates to an apparatus for reading a machine-readable document on the screen of a computer, and a method thereof. Especially, the present invention intends to support the comparative reading work of the related documents by presenting the related passages across the documents to be compared in a form of easily understanding.

2. Description of the Related Art

The objective of the present invention is to help a person who want to compare the contents of a plurality of related documents, such as one who reviews a plurality of survey reports from different areas to make a summary report on the actual situation of these areas or one who reviews a reply document with reference to the question document to be replied. In such a case, a brief list of related portions of the documents to be compared will be helpful for a user to find out the similarities and differences among that documents. As for representative articles regarding the multi-document comparison support, following seven pieces are cited:

[1] Christine M. Neuwirth and David S. Kaufer. The role of external representations in the writing process: Implications for the design of hypertext-based writing tools. In Proc. of Hypertext '89, pp. 319-341. the Association for Computing Machinery, Nov. 1989.

[2] Hypertextixation of a relation manual group using tf.idf method by Nobuyuki Omori, Jun Okamura, Tatsunori Mori, and Hiroshi Nakagawa, Information processing academy research report FI-47-8/NL-121-16, Information processing academy, Sep. 1997.

[3] Gerard Salton, Amit Singhal, Chris Buckley, and Mandar Mitra. Automatic text decomposition using text segments and text themes. In Proc. of Hypertext '96, pp. 53-65. the Association for Computing Machinery, Mar. 1996.

[4] Inderjeet Mani and Eric Bloedorn. Summarizing similarities and differences among related document. Chapter 23, pp. 357-379. The MIT Press, London, 1999. (reprint of Information Processing and Management, Vol. 1, No. 1. pp. 1-23,1999).

[5] Japanese patent laid-open Publication No. 7-325,827

[6] Japanese patent laid-open Publication 2000-57,152 (P2000-57152A)

[7] Japanese patent laid-open Publication No. 11-39,334

Among these, the document [1] proposes an interface called "Synthesis Grid" which summarizes the similarities and differences across related articles in an author-proposition table.

Also, as for the conventional technology for extracting the related parts across documents, the technology that sets a hyperlink across the related parts of different documents with a clue of the appearance of the same vocabulary has been known. For example, the article [2] shows the technology for setting a hyperlink between a pair of document segments that show high lexical similarity. The articles [5] and [6] show the technology for setting a hyperlink across the related parts among documents where the same keyword appears.

In addition, the article [3] shows the technology for extracting the related parts in a single document by detecting the paragraph group having a high lexical similarity. Also, the article [4] shows a method for discovering topic-related textual regions based on coreference relations using spreading activation through coreference of adjacency word links.

As for the technology for presenting similarities and differences of a plurality of related documents, the article [7] shows a multi-document presentation method that distinguishes the information commonly included in a plurality of documents from the other information. The method displays the whole contents of one selected article with highlighting (hatching) common information, and supplements unique information about remaining articles.

However, there are the following two problems in the above-mentioned conventional technology.

The first problem is that it is difficult to determine related part appropriately for a topic that is described by different documents in different manners. There may be a major topic that can be divided into minor topics, and the way of description of such a topic may differ from document to document. For example, the major topic of a document is not necessarily that of another document. The other document may contain only some minor topics related to the first document's major topic. In such a case, the size of related portions should differ from document to document.

However, the conventional methods described above did not consider the size of passages much. In the following article [8], Singhal and Mitra reported that a widely used similarity measure, i.e., the cosine of a pair of weighted term vectors, is likely to calculate inappropriately lower/higher scores for longer/shorter documents.

[8] Amit Singhal and Mandar Mitra. Pivoted document length normalization. In Proceedings of the 19th Annual International ACM-SIGIR Conference on Research and Development in Information retrieval, pp. 21-29. the Association for Computing Machinery, 1996.

In the following article [9], Callan also reported that passages based on paragraph boundaries were less effective for passage retrieval than passages based on overlapping text windows of a fixed size (e.g. 150-300 words). These observations suggest that related passage extraction should consider carefully the size of the passage to be extracted, especially in such a case that the size of related portions of the target documents much differ each other.

[9] James P. Callan. Passage-level evidence in document retrieval. In Proceedings of the 17th Annual International ACM-SIGIR Conference on Research and Development in Information retrieval, pp. 302-310. the Association for Computing Machinery, 1994.

The second problem is that the relationship between a set of related part regarding a certain topic and either another set of those regarding a different topic or the whole original document cannot be clearly expressed. For example, the configuration of related parts across long documents is often complicated.

Since then, in order to understand overall relationship between long documents, it is required not only to read a set of related parts across documents regarding individual topic, but also to review the related parts in detail by considering the mutual relationship between a plurality of topics, and the context where each related part appears. At this time, it is desirable to have a look at a plural sets of related parts, and easily to refer to the periphery part of each related part, but such a function is not realized in the above-mentioned conventional technology.

SUMMARY OF THE INVENTION

The first object of the present invention is to provide a document reading apparatus for taking out and presenting an appropriate part for the topics that are different in grading for each document, and a method thereof. The second object of the present invention is to provide a document reading apparatus for presenting many sets of related parts across documents regarding a plurality of topics in a form easily compared, and a method thereof.

The document reading apparatus of the present invention is provided with a thematic hierarchy recognizing device, a topic extracting device and also a topic relation presenting device. The apparatus presents a plurality of documents that are designated as a reading object to a user, and supports the comparison process of those documents.

The thematic hierarchy recognizing device recognizes the respective thematic hierarchies of a plurality of documents to be read. The topic extracting device extracts a topic that commonly appears in the plurality of documents to be read based on the recognized thematic hierarchy. The topic relation presenting device takes out a description part corresponding to the extracted topic from the respective documents to be read and outputs the thus-taken out part.

BRIEF DESCRIPTION OF THE DRAWINGS

FIG. 2 is a configuration diagram of the document reading apparatus of the present invention;

FIG. 4 is a diagram showing a storage medium;

FIG. 5 is a diagram showing a document to be read;

FIG. 7 shows an example of the word recognition result;

FIG. 9 shows an example when Japanese is looked up in the dictionary;

FIG. 10 shows an example when English is looked up in the dictionary;

FIG. 11 a flowchart showing a thematic hierarchy recognition process;

FIG. 14 is a table showing the relationship between a transfer mean value and a document area;

FIG. 18 is a graph showing data to be related to;

FIG. 25 shows an output example of the related part;

FIG. 27 is a flowchart showing an important sentence selecting process;

FIG. 28 shows a summary example of the related part (No. 1);

FIG. 29 shows a summary example of the related part (No. 2);

FIG. 30 shows a summary example of the related part (No. 3)

FIG. 31 shows an example of the topic relation presentation with a function of referring to an original document;

FIG. 33 shows output examples of the related parts of three documents;

FIG. 35 shows the leading part of an English document to be read;

FIG. 36 shows a word recognition result of the English document to be read;

FIG. 37 shows an example of a stop word;

FIG. 39 shows a summary example of related parts for English documents (No. 1);

FIG. 40 shows a summary example of related parts for English documents (No. 2); and FIG. 41 shows a summary example of related parts for English documents (No. 3).

DESCRIPTION OF THE PREFERRED EMBODIMENTS

Figure 1:
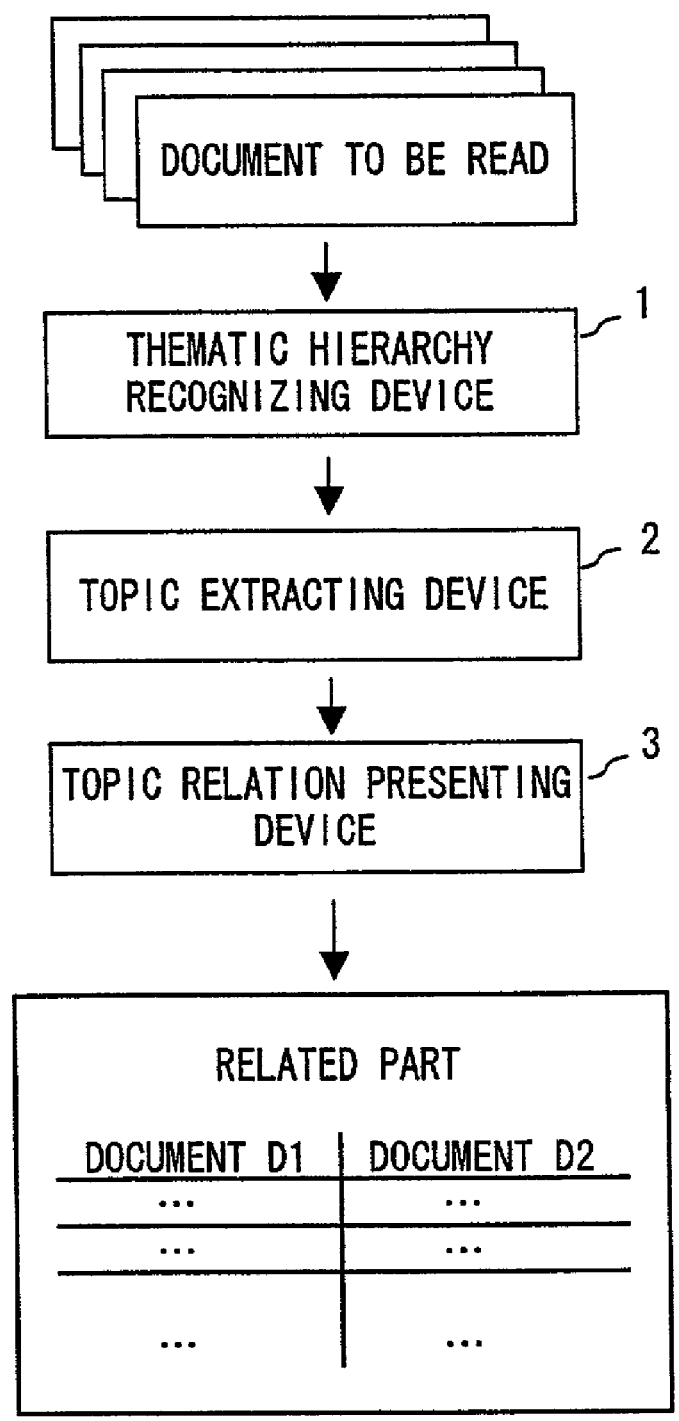
FIG. 1 is a block diagram of a document reading apparatus of the present invention.

The preferred embodiments of the present invention will be explained in detail with reference to the drawings. FIG. 1 is a block diagram showing the principle a document reading apparatus of the present invention. The document reading apparatus of FIG. 1 is provided with a thematic hierarchy recognizing device 1, a topic extracting device 2 and also a topic relation presenting device 3. The apparatus presents a plurality of documents that are designated as a reading object by a user, and supports the comparison process of those documents.

The thematic hierarchy recognizing device 1 recognizes the respective thematic hierarchies of a plurality of documents to be read. Here, the thematic hierarchy means a hierarchical structure corresponding to the "aboutness" of a text. Each of its layers expresses a disjoint segmentation of a text according to topics of certain grading. Namely, each layer consists of several segments that, taken together, compose the entire text and that individually describe identical or related topics. Intuitively, its structure can be illustrated as follows. The root node corresponds to the entire text, and textual units on the bottom layer are atomic units that individually describe a certain minor topic. A textual unit in an upper layer comprises several textual units in the layer immediately below it according to the topic-subtopic relations.

The topic extracting device 2 extracts topics that commonly appears in a plurality of the documents based on the recognized thematic hierarchies. At this time, a plurality of thematic hierarchies that individually correspond to a plurality of documents are compared, and the combination of topics having strong relevance is extracted to be output as a common topic among a plurality of documents. In such a case that the first and the second thematic hierarchies are obtained from a document D1 and a document D2, a relevance score for each pair of nodes (topics) from the first and the second thematic hierarchies is calculated, and topic pairs with a high relevance score are extracted as common topics.

The topic relation presenting device 3 takes out a pair of description parts from the first and the second documents for each topic. It then presents the taken-out description parts in an easily comparable form.

In this way, the document reading apparatus detects topics of various grading (sizes) that are included in a document to be read using the thematic hierarchy recognizing device 1. The apparatus then extracts common topics among the documents from the detected topics using the topic extracting device 2. Finally, the apparatus outputs a set of description parts of the documents for each topic that the topic extraction device 2 extracts.

By detecting all the topics of various grading from each document and checking all the relevance scores corresponding to the possible combinations of topics of different documents, a set of topic-related description parts (passages) of different documents can be extracted accurately even if the sizes of those description parts differ much from document to document.

Furthermore, the document reading apparatus of FIG. 1 has the following various functions:

The topic extracting device 2 obtains the relevance degree between topics by the lexical similarity of the corresponding passage in the document, and selects a pair of topics as a common topic (group) by the threshold that is set based on the inclusive relationship of topics. For example, a pair of topics A and B in an upper layer with a relevance score R1 is output as a common topic, only when none of the smaller topics included in topic A or topic B shows a relevance score equal to or more than R1.

In this way, the output of an inappropriate related passage is restrained, so that the related passages can be more efficiently output.

Further, the topic relation presenting device 3 groups related passages by each common topic and presents the grouped passages side by side. In this way, a user can read the corresponding passages regarding an individual topic while contrasting them, even in the case that a plurality of common topics are detected.

Further, the topic relation presenting device 3 can also summarize and output the contents of each related passage. In this way, a user can take a look at the whole list of related passages, even in the case that many common topics are detected.

Still further, the topic relation presenting device 3 can present a portion of the original document with related passages. For example, the button (hyper link or the like) for an original document reference is presented in each related passage in a window, and the corresponding portion of the original document is presented in another window in accordance with the request made by the button. In this way, a user can review the contents of a passage in the context where it appears.

The topic relation presenting device 3 also presents a drawing showing the thematic hierarchy of the document to be read, and presents the corresponding parts of that document in accordance with a designation of a user on the screen. For example, the device presents two thematic hierarchies in tree graphs where a node depicts a topic and an arc depicts a pair of related topics. In the case that a user designates an arc, the device presents the related portions corresponding to the arc in another window. In the case that a node is designated, the device similarly presents the portion corresponding to the node.

In this way, a user can review a related portion with referring to the context and/or other document portions according to his/her interest with a clue of the topic configuration of the whole document, so that a plurality of documents can be more efficiently compared and read.

Further, the topic relation presenting device 3 prepares and presents a new integrated document by using one document as a reference document and taking related passages from the other documents into that document. In this way, a user can effectively prepare the integrated document such as a report obtained by collecting a plurality of documents, etc.

FIG. 2 shows the basic configuration of the document reading apparatus of the present invention. The document reading apparatus 12 of FIG. 2 is provided with an input unit 21, a tokenizer 22, a machine readable dictionary 24, a thematic hierarchy detector 25, a topic extractor 27, and an output unit 28.

The thematic hierarchy recognizing device 1, topic extracting device 2, and topic relation presenting device 3 of FIG. 1 correspond to the thematic hierarchy detector 25, the topic extractor 27, and the output unit 28 of FIG. 2, respectively.

In FIG. 2, when a plurality of documents to be read 11 are input, the document reading apparatus 12 extracts related passages across those documents corresponding to a common topic, and presents the extracted related passages to a user.

The input unit 21 reads a plurality of documents to be read 11, and sequentially passes each document to the tokenizer 22. The tokenizer 22 linguistically analyzes each document using a morphological analyzer 23, and marks up content words (e.g., noun, verbs, or adjectives) in the document 11. At this time, the morphological analyzer 23 converts a sentence in the document 11 to a word list with parts of speech information in reference to the machine readable dictionary 24. The machine readable dictionary 24 is a word dictionary for a morphological analysis, and describes the correspondence between the notation character string and the information about the parts of speech and the inflection (conjugation) type of a word.

The thematic hierarchy detector 25 receives a plurality of documents to be read 11 with the marks of content words, recognizes the thematic hierarchy of each document 11, and outputs it. First of all, the thematic hierarchy detector 25 automatically decomposes each of the document 11 into segments of approximately the same size using a thematic boundary detector 26. Here, each segment corresponds to a portion of the document that describes an identical topic of a certain grading. The thematic hierarchy detector 25 repeats this procedures with varying segment size to be decomposed. Then, by correlating the boundaries of smaller and larger segments, thematic hierarchy data are prepared to be output.

The thematic boundary detector 26 recognizes a continuous portion with a low lexical cohesion score as a candidate section of a thematic boundary. The lexical cohesion score indicates the strength of cohesion concerning a vocabulary in the vicinity of each location in the document. For example, it can be obtained from the similarity of the vocabulary that appears in adjacent two windows of a certain width that are set at a location.

The topic extractor 27 receives a plurality of thematic hierarchies that individually correspond to each of a plurality of documents to be read 11 from the thematic hierarchy detector 25, detects a topic that commonly appears in two or more documents, and outputs a list of the common topics.

The output unit 28 takes out the passages corresponding to each of the common topics that are extracted by the topic extractor 27, correlates these passages, and presents the correlated passages to a user 13.

Figure 3:
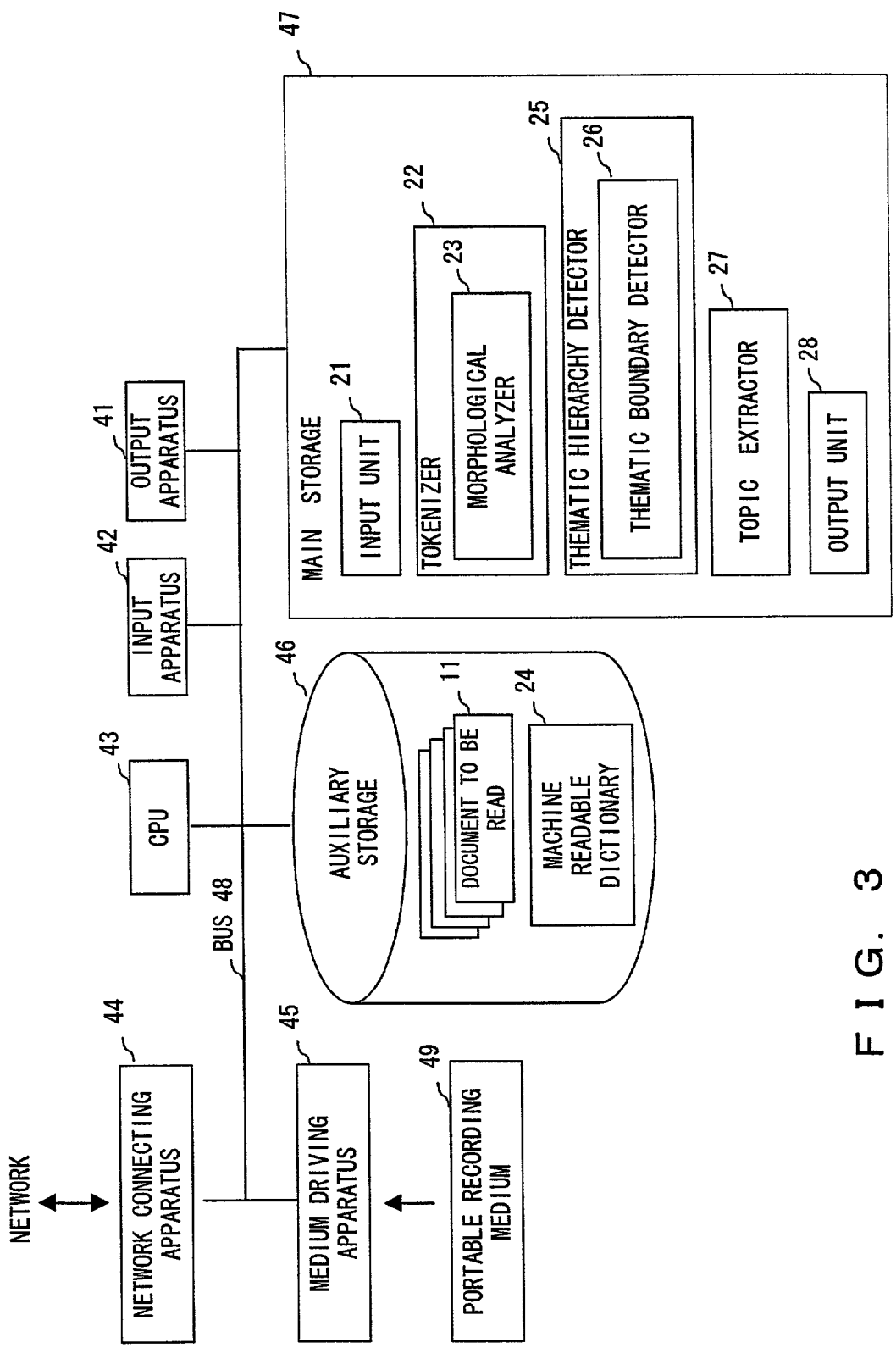
FIG. 3 is a configuration diagram of an information processor.

The document reading apparatus 12 of FIG. 2 can be configured by using the information processor (computer) as shown in FIG. 3. The information processor of FIG. 3 is provided with an outputting apparatus 41, an inputting apparatus 42, a CPU (central processing unit) 43, a network connecting apparatus 44, a medium driving apparatus 45, an auxiliary storage 46 and a memory (main memory) 47, which are mutually connected by a bus 48.

The memory 47 includes, for example, a ROM (read only memory), a PAM (random access memory), etc., and stores the program and data that are used for a document reading process. Here, the input unit 21, tokenizer 22, morphological analyzer 23, thematic hierarchy detector 25, thematic boundary detector 26, topic extractor 27, and output unit 28 are stored as a program module. The CPU 43 performs a required process by running the program utilizing the memory 47.

The outputting apparatus 41 is, for example, a display, a printer, or the like. It is used for the inquiry to the user 13 and the output of the document to be read 11, the processing result, etc. The inputting apparatus is, for example, a keyboard, a pointing device, a touch panel, a scanner or the like, and it is used for the input of the instructions from the user 13, and the document to be read 11.

The auxiliary storage 46 is, for example, a magnetic disk apparatus, an optical disk apparatus, a magneto-optical apparatus, or the like, and stores the information of document to be read 11, machine readable dictionary 24, etc. The information processor stores the above-mentioned program and data in the auxiliary storage 46, and it loads them into the memory 47 to be used, as occasion demands.

The medium driving apparatus 45 drives a portable storage medium 49, and accesses the record contents. As for the portable storage medium 49, an optional computer-readable storage medium such as a memory card, a floppy disk, a CD-ROM (compact disk read only memory), an optical disk, magneto-optical disk, or the like is used. The user 13 stores the above-mentioned program and data in the portable storage medium 49, loads them into the memory 47 to be used, as occasion demands.

The network connecting apparatus 44 communicates with an external apparatus through an optional network such as a LAN (local area network), etc., and performs the data conversion associated with the communication. The information processor receives the above-mentioned program and data from the other apparatus such as a server, etc., through the network connecting apparatus 44, and loads them into the memory 47 to be used as occasion demands.

FIG. 4 shows a computer-readable storage medium that can supply a program and data to the information processor of FIG. 3. The program and data that are stored in a database 51 of a portable storage medium 49 and a server 50 are loaded into the memory 47. Then, the CPU 43 runs the program using the data, and performs a required process. At this time, the server 50 generates a conveyance signal for conveying the program and data, and transmits the signal to the information processor through an optional transmission medium on the network.

Next, the actuation of each module of the document reading apparatus 12 that is shown in FIG. 2 is explained in more detail using a specific example.

As for an example of the documents to be read, the representative question made by Hiroko Mizushima, Diet member (first document to be read) and the answer of the prime minister to the question (second document to be read) are used after they are respectively taken out as one document from "the minutes No. 2 of 149th plenary session of the House of Representatives" (on Jul. 31, 2000). The representative question of the House of Representatives is advanced in such a way that the prime minister/relation minister answers the questions, after the Diet member who represents a political party asks questions about several items in a bundle. In this representative question, the total eight items are asked regarding six problems of education of children, civil law revision, Diet operation, harmful information, infant medical treatment, and annual expenditure supply method.

FIG. 5 shows the leading part of the first document to be read that is taken out from the representative question part. In FIG. 5, since the underlined part (the name of the Diet member who asks the question and the complement information regarding the proceeding progress that is parenthesized) are not the contents of a representative question, they are removed and subsequent processes are performed. As for the second document to be read that is obtained by taking out the prime minister's answer part, the name of the prime minister, and the complement information that is parenthesized are similarly removed and subsequent processes are performed.

Figure 6:
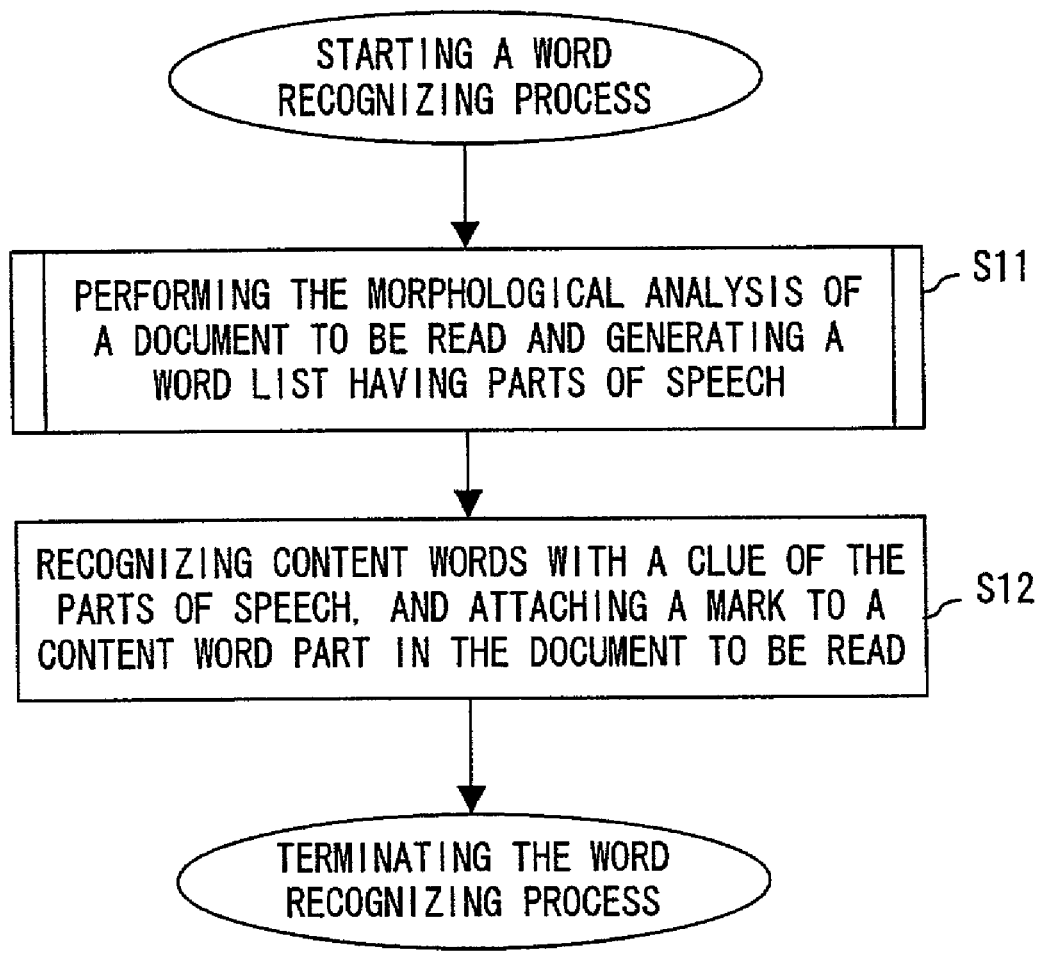
FIG. 6 is a flowchart showing a word recognition process.
Figure 7:
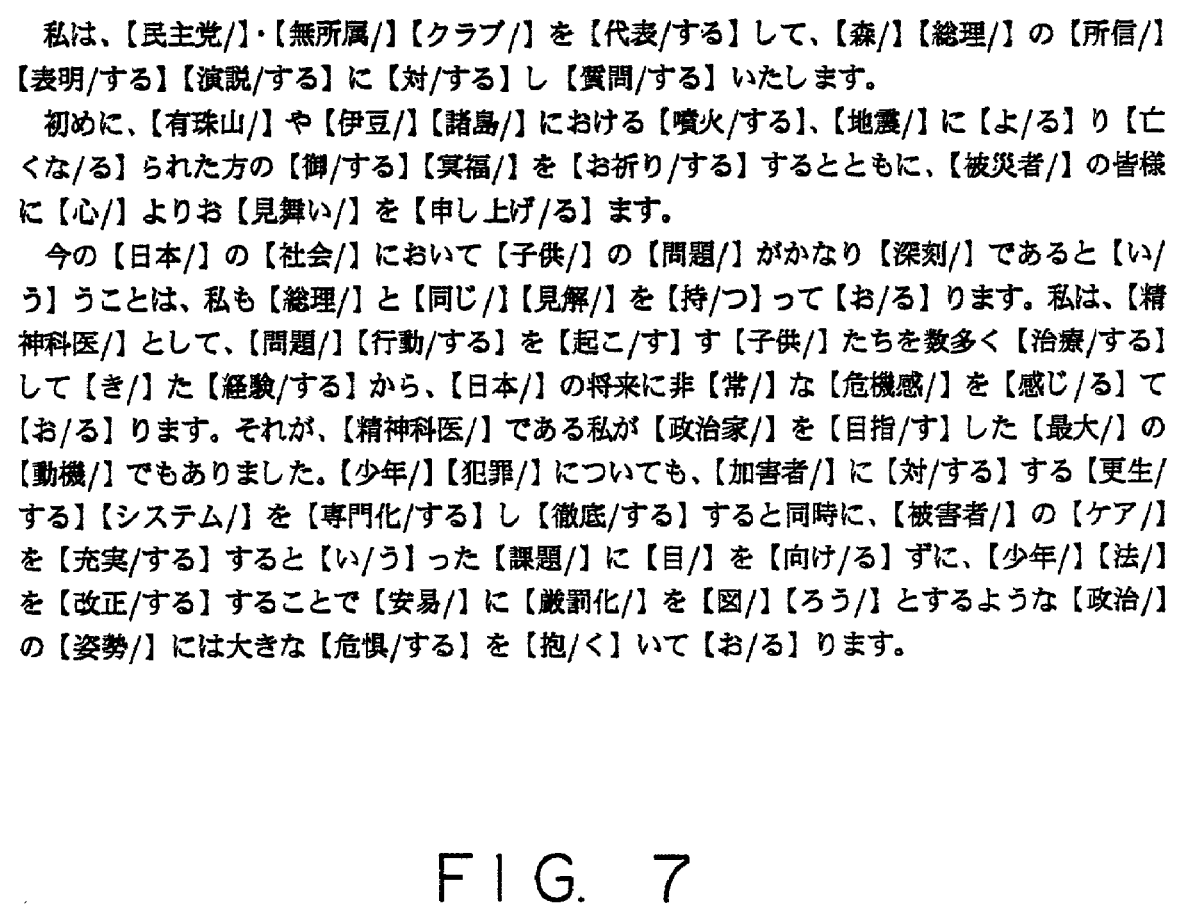

FIG. 6 is a flowchart showing the word recognition process by the tokenizer 22. First of all, the tokenizer 22 performs the morphological analysis to an individual document to be read, and prepares a word list with the parts of speech (step S11). Next, the tokenizer 22 marks up the parts of the document corresponding to content words (nouns, verbs, or adjectives) with a clue of part of speech information recorded in the word list (step S12), and terminates the processes. FIG. 7 shows the processing result of the tokenizer 22 for the document part of FIG. 5.

Figure 8:
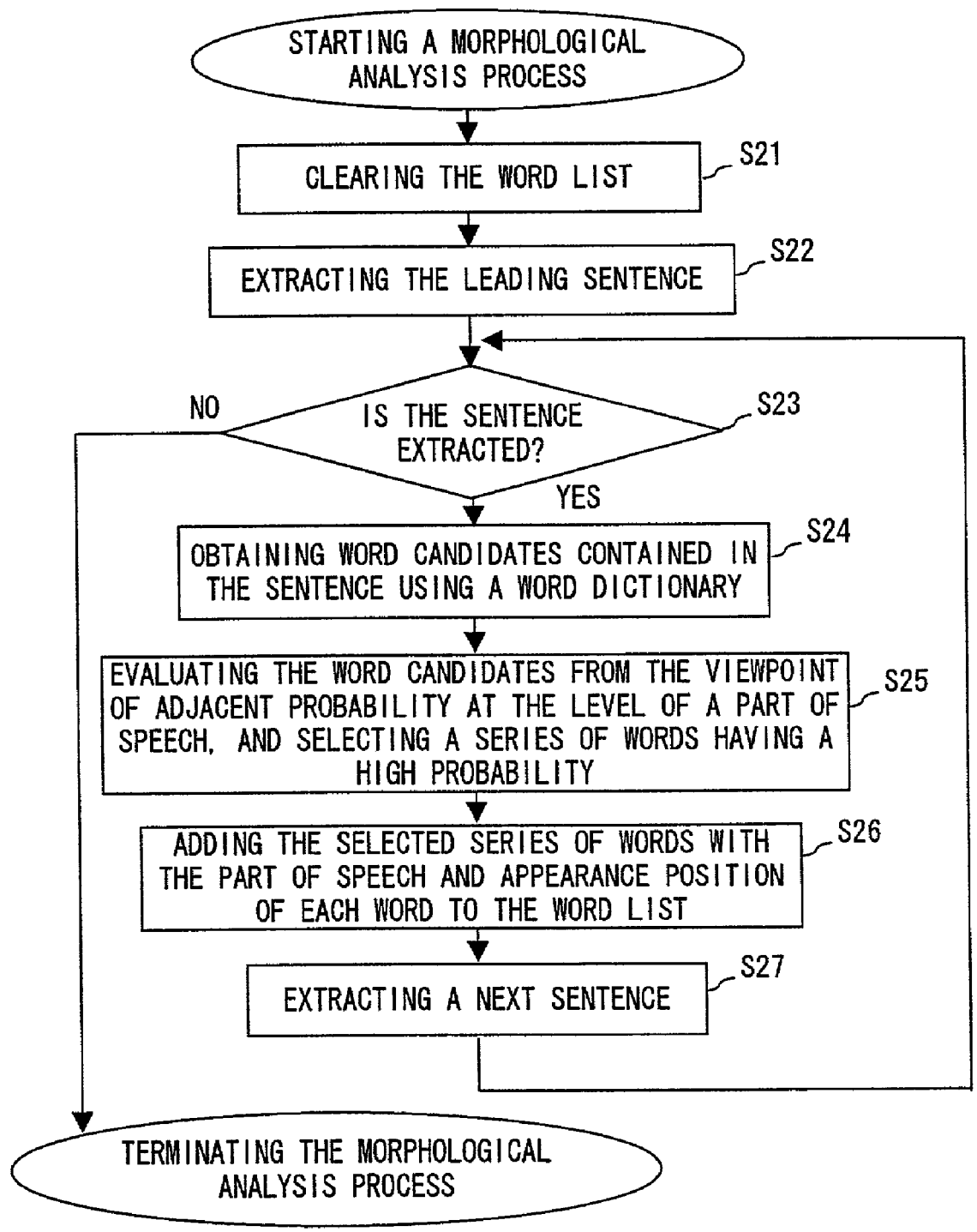
FIG. 8 is a flowchart of a morphological analysis process.

In step S11 of FIG. 6, the morphological analyzer 23 performs the morphological analysis processing as shown in FIG. 8. First of all, the morphological analyzer 23 clears the word list (step S21), tries the taking out of a sentence from the beginning portion of the (remaining) document with such a clue as a period or other delimiter symbols (step S22), and determines whether the sentence is taken out (step S23).

If the sentence is taken out, the morphological analyzer 23 obtains word candidates that are possibly included in the sentence in reference to the machine readable dictionary 24 (step S24). In the case of Japanese, since a word boundary is not formally explicated as shown in FIG. 7, all the words corresponding to the character substrings that are included in the sentence are obtained as a candidate. If a sentence, for example, "東京都は大都市だ" is taken out, all the character substrings that are included in this sentence become the candidate of a word, as shown in FIG. 9.

In the case of English, on the contrary, since words are explicitly separated by spaces, it becomes the main function required for morphological analysis to determine the parts of speech for each word. For example, in the case that a sentence "Tokyo is the Japanese capital." is taken out, the root forms and parts of speech of five words that are included in this sentence are required, as shown in FIG. 10.

Next, the morphological analyzer 23 selects an adequate series of words from a viewpoint of the adjacency probability at the level of the parts of speech (step S25), adds the selected series of words with the part of speech and appearance location of each word to the word list in the order of appearance (step S26). Next, the morphological analyzer 23 tries to take out the next sentence (step S27), and repeats the processes in and after step S23. When no sentence can be taken out in step S23, the processes terminate.

In the word recognition result of FIG. 10, the part that is parenthesized is the content word that the morphological analyzer 23 recognizes. In the case of the content word is a conjugative word (verb/adjective), the part before the slash (/) in the parentheses indicates the root of word and the part after the slash (/) indicates an ending of the predicative form. This information will be used to distinguish the word in the subsequent process, but the subsequent process can also be performed with such information as the parts of speech and conjugation type instead of this information. In short, optional identification information can be used as long as the information distinguishes the word that cannot be distinguished regarding only the root of the word, for example, "いう" and "いる".

Further, various methods of evaluating the validity of the arrangement of words in step S25 have been known as a morphologic analysis method, and an optional method can be used. For example, the method of evaluating the validity of the arrangement of words using the appearance probability that is estimated by training data is reported in the following articles [10] and [11].

[10] Eugene Charniak. Hidden markov models and two applications. In Statistical Language Learning, chapter 3, pp. 37-73. The MIT Press, 1993.

[11] Masaaki Nagata. A stochastic Japanese morphological analyzer using a forward-DP backward-A* N-best search algorithm. In Proc. of COLING '94, pp. 201-207, Aug. 1994.

In the example of FIG. 7, the tokenizer 22 takes out all the content words, but it can take out only the words which are noun. Further, in the case of processing English document, all the words separated with white spaces but the vocabulary that appears everywhere irrespective of the topics (function word such as article, preposition, etc. or the words which appear too frequently) can be used without performing the morphological analysis process. Such a process can be easily realized with a stop word list that stores the function word or the word that appears with the high frequency instead of the machine readable dictionary 24.

Next, the process of the thematic hierarchy detector 25 is explained. In the present embodiment, a part of the document where a topic is described is recognized based on the technology shown in the Japanese patent laid-open Publication No. 11-272, 699 "Document summarizing apparatus and the method" that is the prior application of the present invention. In this method, the hierarchical configuration of the topic is recognized using the following procedures.

1. Estimation of the Section of Thematic Boundary Location

A location where a thematic boundary might exist is obtained as the thematic boundary candidate section, on the basis of the cohesion score that is calculated with a certain window width. Then, this process is repeated for a plurality of window widths that differ in size, and the thematic boundary candidate section is obtained for each size of topics, ranging from the boundaries showing the gap of large topics to the boundaries showing the gap of small topics.

2. Recognition of the Hierarchical Relation of Topics

The thematic boundary candidate sections that are obtained with the different window widths are integrated, and the hierarchical structure of topics and thematic boundaries are determined.

FIG. 11 is a flowchart showing the thematic hierarchy recognition process performed by the thematic hierarchy detector 25. The thematic hierarchy detector 25 first receives three parameters of the biggest window width w1, the minimum window width w_min, a window width ratio r from a user (step S41), and obtains a set W of window widths to measure the cohesion score (step S42). The set W of window widths is obtained by collecting terms equal to or more than w_min from the geometric series of which the first term is w1 and of which common ratio is 1/r.

At this time, it is sufficient on practical use to give about ½ to ¼ of the size of the whole document for the biggest window width w1 in W, to give the words equivalent to a paragraph (for example 40 words) for the minimum window width w_min, and to give 2 for the window width ratio r. In the following, the value of w1=320 (word), w_min=40 (word), and r=2 are used.

Next, the thematic hierarchy detector 25 calculates the cohesion score of each location in the document for each window width in W on the basis of the document of which contents word is marked as shown in FIG. 7, and records as a cohesion score series (step S43).

Here, the vocabularies that appear in two windows set at the front and back of each location (reference point) of the document are first compared. A value that becomes bigger as the number of common vocabularies increases is calculated, and the calculated value is set as the cohesion score at that location. Then, the calculation of the cohesion score is repeated while shifting the location of the window at a fixed-width (tic) intervals from the leading part of the document toward the end. The calculated cohesion score is recorded as the series from the leading part of the document to the end.

Any interval width tic is acceptable if the value is smaller than window width. Here, ⅛ of the window width is used in consideration of the processing efficiency. The value tic can be designated by a user, too.

Various methods are available as the calculation method of a cohesion score. In the following, cosine measure, which has been widely used as the scale of similarity in the field of information retrieval, is used. The cosine measure is obtained by the following equation:

$$sim(b_l, b_r) = \frac{\sum_t W_{t,bl} W_{t,br}}{\sqrt{\sum_t W_{t,bl}^2 \sum_t W_{t,br}^2}} \quad (1)$$

Here, $b_l$ and $b_r$ express the part of the document that is included in the left window (window on the side of the leading part of the document) and the right window (window on the side of the end part of the document), respectively. $W_{t,bl}$ and $w_{t,br}$ show the appearance frequency of word t that appears in the left window and right window, respectively. Also, $\Sigma_t$ of the right side of the equation (1) shows the total sum of the words t.

The similarity of the equation (1) increases (the maximum 1) as the number of common vocabularies that are included in the right and left windows increases, while the similarity becomes 0 when there is no common vocabulary. Namely, the part with a high similarity score is expected to describe an identical or similar topic. Conversely, the part with a low score is expected to contain a thematic boundary.

Figure 12:
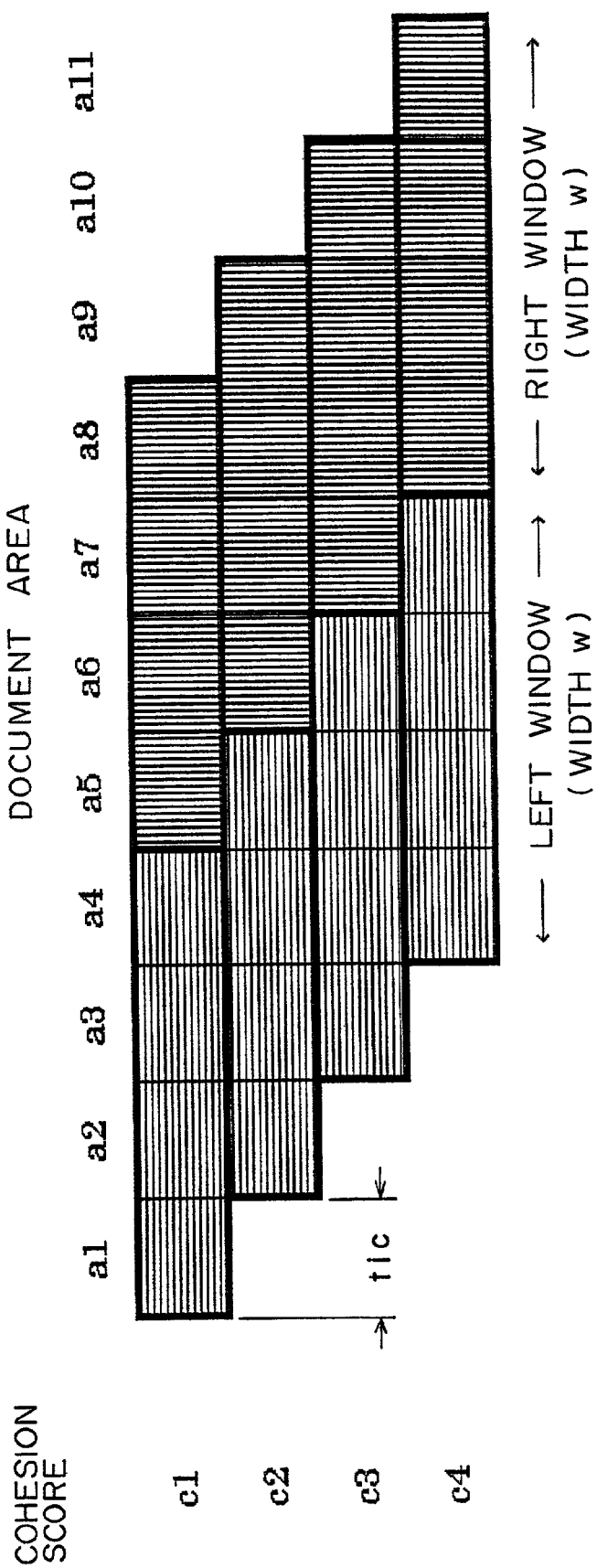
FIG. 12 is a diagram showing a series of a cohesion score.

Next, FIG. 12 shows an example of the series of the cohesion scores that are recorded in step S43. In FIG. 12, ¼ of the window width w is used as interval width tic, to make the explanation short. Document areas a1 to a11 are the areas having the fixed width corresponding to the interval width tic. Also, c1 shows the cohesion score of window width w, which is calculated by setting the boundary of a4 and a5 in the document as a reference point. In other words, c1 is the cohesion score calculated by setting the part of document areas a1 to a4 as the range of the left window and setting the part of document areas a5 to a8 as the range of the right window.

The next c2 expresses the cohesion score of the window width w that is calculated by shifting the window to the right by tic and setting the boundary of a5 and a6 as a reference point. c1, c2, c3, c4 . . . that are calculated by sequentially shifting the window to the right by tic are called the series of the cohesion scores of window width w from the leading part of the document to the end.

Figure 13:
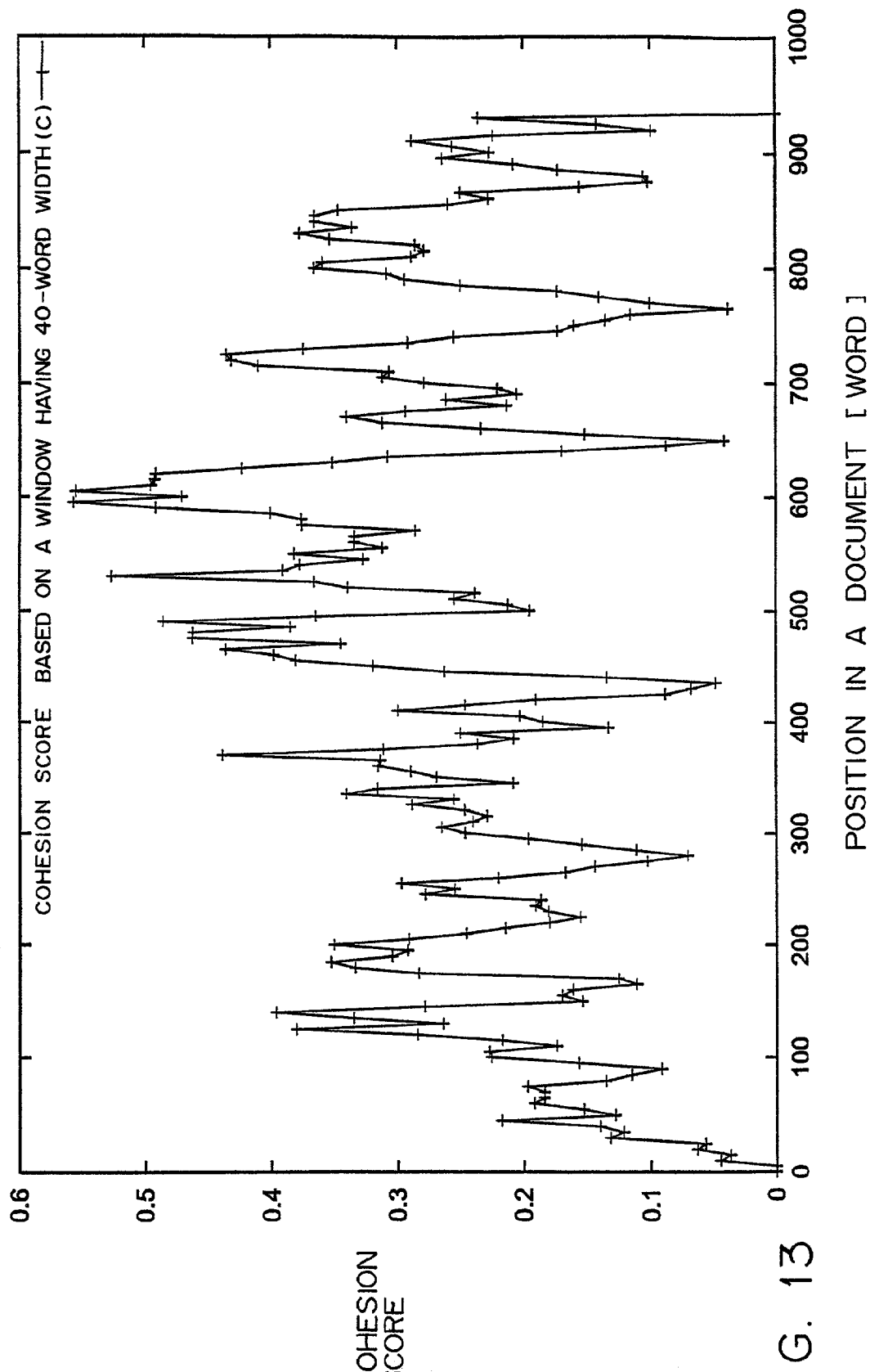
FIG. 13 is a chart showing an example of cohesion score distribution.

FIG. 13 shows a graph prepared in such a way that the total number of the content words that appear between the beginning of the document and each reference point is set as a horizontal axis, and the cohesion score series of the minimum window width (40 words) is plotted in the above-mentioned word recognition result. For example, the total number of the content words in the areas a1 to a5 is indicated by the location of the reference point for cohesion score c2 of FIG. 12. Here, the cohesion score is calculated from the beginning of the document toward the end by setting ⅛ (5 words) of the window width of 40 words as interval width tic.

Next, the thematic hierarchy detector 25 analyzes the cohesion score series of the respective window widths using the thematic boundary detector 26, and sets the section with a low cohesion score as a thematic boundary candidate section (step S44).

Next, the thematic hierarchy detector 25 correlates the thematic boundary candidate sections with each other, which are obtained based on the cohesion score series with different window widths, and determines the boundary location of the topic in the units of words (step S45). Then, the unit performs fine control on the boundary location of the topic determined in the units of words so that the boundary location matches with the sentence boundary (starting position of a part which is divided by a period), and prepares thematic hierarchy data, thereby outputting the data (step S46). Thus, the thematic hierarchy recognition process terminates.

In order to match the thematic boundary location with the sentence boundary in step S46, the starting position of a sentence that is the closest to the recognized thematic boundary location is obtained, and the starting position may be set as the location of the final thematic boundary location. Otherwise, more appropriate topic boundary (starting position of the topic) can be obtained using the sentence boundary recognition technology, "Document summarizing apparatus and the method" disclosed in Japanese patent application No. 11-205061 filed prior to the present invention.

Next, the thematic boundary candidate section recognition process performed in step S44 of FIG. 11 is explained using FIGS. 12 and 14. The moving average method that is used here is a statistical method for the time series analysis to grasp the trend of a general situation by removing the small variation, which, for example, is used for the analysis of the variation of stock price, etc. In the present embodiment, the moving average value of the cohesion score series is not only used to disregard the small variation, but also is considered as the forward cohesion force at the starting point of the moving average and as backward cohesion force at the end point of the moving average. In this way, the value is a direct clue for the thematic boundary candidate section recognition.

FIG. 12 shows the relationship between the cohesion score series of c1 to c4 and document areas a1 to a11 as the above-mentioned. The moving average value of the cohesion score series is an arithmetic mean score of continuous n pieces in the cohesion score series, for example, (c1+c2)/2 (two-item moving average), (c1+c2+c3)/3 (three-item moving average), (c1+c2+c3+c4)/4 (four-item moving average).

FIG. 14 shows the contribution of a document area to the moving average of the cohesion score series shown in FIG. 12. Here, three kinds of the moving average of two to four terms of the cohesion scores are shown as an example. The figures in the table indicate the number of times that each document area is used when the cohesion score related to a moving average is calculated. Among these values, the underlined value indicates that the corresponding document area is used for the calculation of all the cohesion scores that are related to the moving average.

For example, a value "1" on the upper-left corner shows that the document area a1 is included in a part of the left window only once in the moving average of four terms c1 to c4. Also, a value "2" on the right of the corner shows that the document area a2 is included in a part of the left window twice in the moving average of four terms c1 to c4. Regarding other numbers of usage times, the meaning is the same.

Since a cohesion score is an index for the strength of a relation between parts adjacent with each other at a point, a moving average value calculated using a cohesion score c1, that is obtained by including the area a1 in the left window, also indicates whether the area a1 is related rightward.

Figure 15:
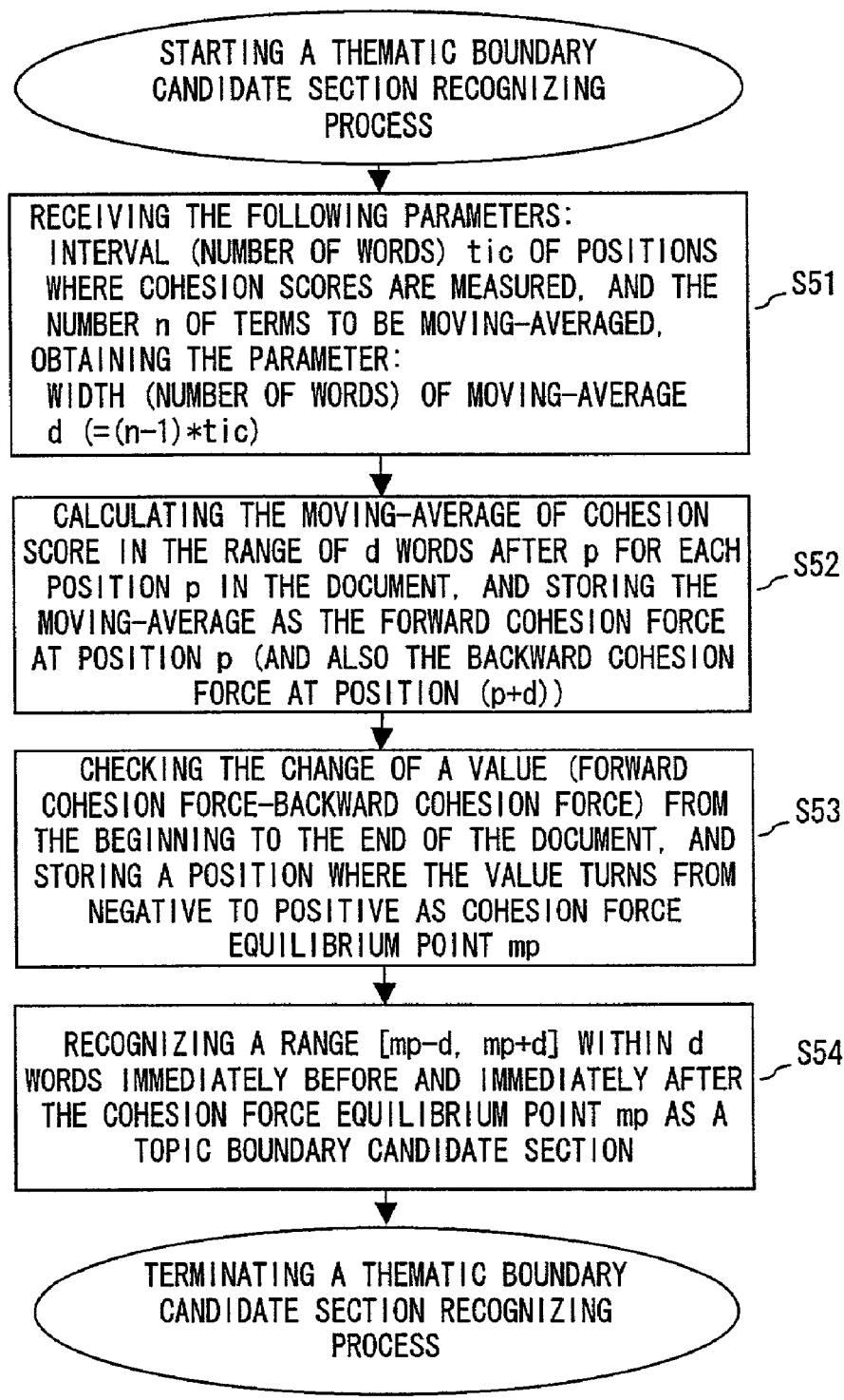
FIG. 15 a flowchart showing a thematic boundary candidate section recognition process.

In other words, it can be said that the moving average value indicates the strength of forward cohesion (forward cohesion force), i.e., how strongly the areas in the left window part with which the moving average value is calculated (a1 to a7 areas for the average of four terms c1 to c4) are pulled in the direction to the end of the document (forward direction: right direction in FIG. 15). On the other hand, it can be also said that the moving average value indicates the strength of backward cohesion (backward cohesion force), i.e., how strongly the areas in the right window part with which the moving average value is calculated (a5 to a11 areas for the average of four terms c1 to c4) are pulled in the direction of the leading part of the document (backward direction: left direction in FIG. 15).

When the relevance between the cohesion force and each document area is reviewed, it is conceivable that the more times an area is included in the window when a cohesion force is calculated, the stronger the contribution of that area to that force is. Since it is conceivable that the lexical cohesion is strong when the vocabularies are repeated in a short interval, the contribution of the area that is close to the reference point (boundary location between the right window and the left window) of the cohesion score is strong. For example, regarding the moving average of four terms of FIG. 14, four boundaries between a4 and a5, a5 and a6, a6 and a7, and a7 and a8 are set as a reference point of the cohesion score. In this case, it is understood that a4 is included in the left window most frequently, and is the closest to the reference point. Also, it is understood that a8 is included in the right window most frequently, and is the closest to the reference point. Therefore, the area having the strongest relationship with the moving average value is a4 for the left window and a8 for the right window.

When similarly choosing the area having the strongest relationship with the moving average of three terms, a4 is obtained for the left window and a7 is obtained for the right window. Further when choosing the area having the strongest relationship with the moving average of two terms, a4 is obtained for the left window and a6 is obtained for the right window. The number of use times of these areas is shown being enclosed with the frame of a thick line in FIG. 14.

On the basis of the above-mentioned observation, the thematic boundary detector 26 handles the moving average value of the cohesion score both as the index of the forward cohesion force at the first reference point inside the area for which the moving average is calculated and as that of the backward cohesion force at the last reference point. For example, the moving average value of four terms c1 to c4 becomes the forward cohesion force at the boundary of a4 and as and the backward cohesion force at the boundary of a7 and a8.

FIG. 15 is a flowchart of the thematic boundary candidate section recognition process performed by the thematic boundary detector 26. The detector 26 first receives the interval width tic of the cohesion score series and the number n of terms to be moving-averaged from the thematic hierarchy detector 25 (step S51).

As for the rough standards of the values of these parameters, the interval width tic is about ⅛ to ¹⁄₁₀ of the window width w, and the number n of terms is about the half of w/tic (4 to 5). Further, the distance from the first to the last reference points of the area for which the moving average is calculated is computed by (n−1)*tic, and the computed value is made the width (word) of the moving average.

Next, the moving average of the cohesion score is computed within the range of p to p+d for each location p in the document, and the average value is recorded as the forward cohesion force at the location p (step S52). This value is simultaneously recorded as the backward cohesion force at the location p+d.

Next, the difference between the forward cohesion force and backward cohesion force in each location is checked from the beginning of the document toward the end. The location where the difference changes from negative to positive is recorded as a negative cohesion force equilibrium point mp (step S53).

The negative cohesion force equilibrium point is a point such that the backward cohesion force is superior in the left of the point, and that the forward cohesion force is superior in the right of the point. Therefore, it is conceivable that the connection of the left and right parts is weak. Therefore, the negative cohesion force equilibrium point becomes the candidate location of a topic boundary.

Next, a range [mp−d, mp+d] within d words immediately before and immediately after the recorded negative cohesion force equilibrium point mp as the thematic boundary candidate section (step S54), and the processes are terminated.

Figure 16:
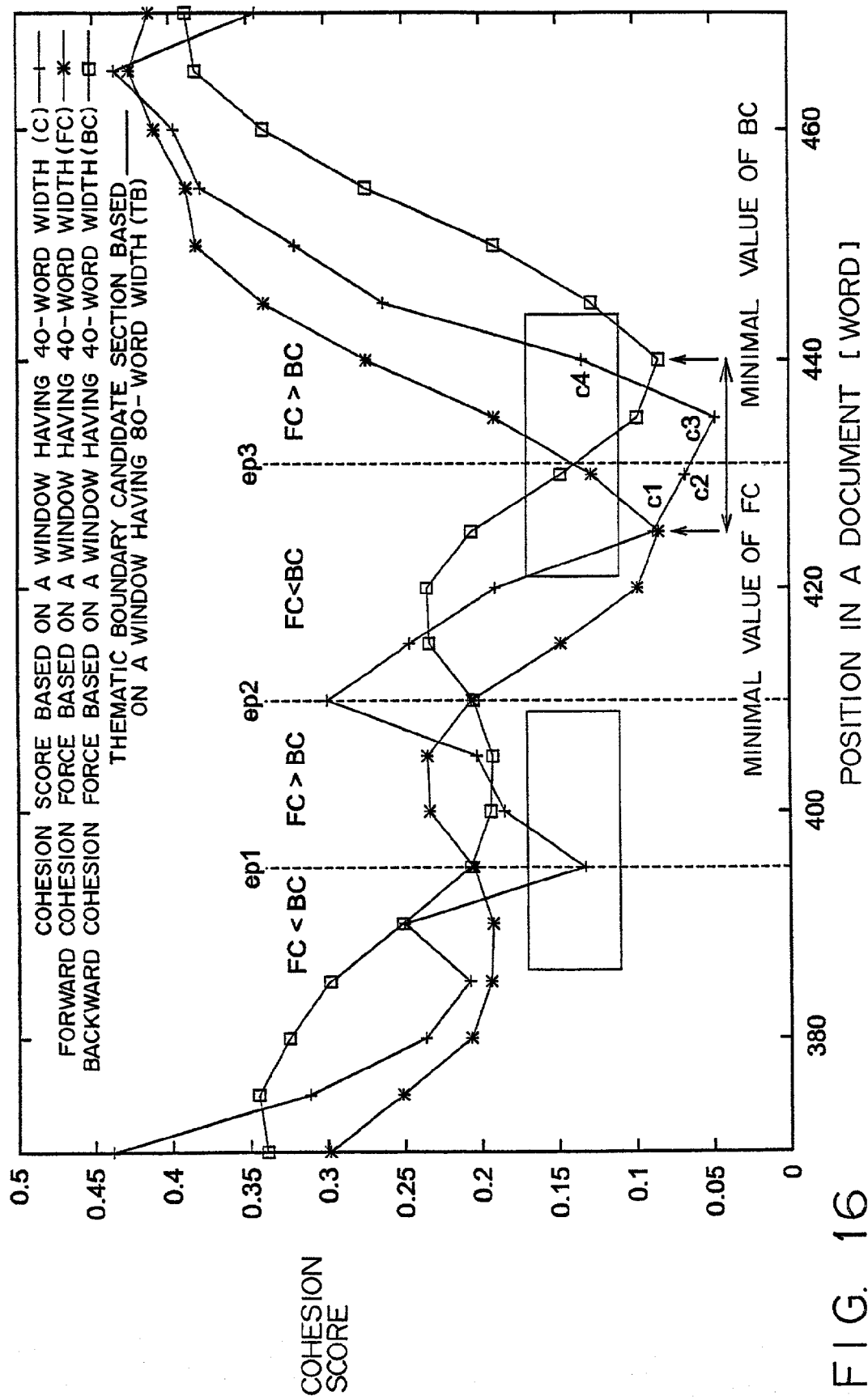
FIG. 16 is a graph showing a cohesion force equilibrium point.

The meaning of recognizing the thematic boundary candidate section on the basis of the difference between the forward cohesion force and the backward cohesion force is explained using FIG. 16. FIG. 16 shows the distribution of the cohesion score, and the forward and backward cohesion forces using the window of 40-word width in the vicinity of 400 words (370 to 400 words) of FIG. 13. As for the interval width tic, ⅛ of the window width is adopted.

In FIG. 16, the polygonal line graph plotted by a symbol '+' expresses the series of cohesion force C, the polygonal line graph plotted by a symbol '*' expresses the series of forward cohesion force FC, and the polygonal line graph plotted by a symbol '□' expresses the series of backward cohesion force BC. The area indicating the thematic boundary candidate section that is shown with a rectangle will be described later.

Further, ep1, ep2, and ep3 that are shown with the dotted lines show three points (cohesion force equilibrium points) where the difference between the forward cohesion force and the backward cohesion force becomes 0. At the left side of the first point ep1, the backward cohesion force is superior to the forward cohesion force. From the right side of ep1 to the next point ep2, the forward cohesion force is superior to the backward cohesion force. Furthermore, from the right side of p12 to the last point ep3, the backward cohesion force is superior to the forward cohesion force. At the right side of ep3, the forward cohesion force is superior to the backward cohesion force.

Therefore, ep1 and ep3 are the negative cohesion force equilibrium point where the difference between the forward cohesion force and the backward cohesion force changes from negative to positive, and ep2 is the positive cohesion force equilibrium point where the difference changes from positive to negative.

It is understood from the change of cohesion force that the area on the left side of the point ep1 shows the comparatively strong cohesion with any part on the further left side, the areas of both sides of the point ep2 show the strong cohesion toward ep2, and the area on the right side of the point ep3 shows comparatively strong cohesion with any part on the further right side. Actually, the cohesion score that is plotted with the forward and backward cohesion forces takes a minimal value at the vicinity of ep1 and ep3, and takes the maximal value at the vicinity of ep2. In this way, the change of the forward and backward cohesion forces is closely related to the change of cohesion score.

There is a minimal point (in this case, c3) of cohesion score series in the vicinity of the cohesion force equilibrium point ep3 of FIG. 16. The minimal value of FC and BC showed with an upward arrow is the value that is obtained by moving-averaging the cohesion scores (c1 to c4) of a horizon arrow part. In this way, the cohesion force generally takes a minimal value in the vicinity (within the width of the moving average) corresponding to the minimal point of the cohesion score. In the case that there is small variation in a narrower range than the area where the moving average is computed, however, there is a case that the moving average value (i.e., cohesion force) does not takes a minimal value due to the smoothing operation of the moving average.

Since the forward cohesion force is moving average value recorded at the starting point of the area where the moving average is computed, the minimal location of forward cohesion force becomes the left of the minimal location of cohesion score. Similarly, the minimal location of backward cohesion force becomes the right of the minimum location of a cohesion score. Then, a cohesion force equilibrium point is formed in the area where the moving average is computed if the variation of the cohesion score is sufficiently large.

Figure 17:
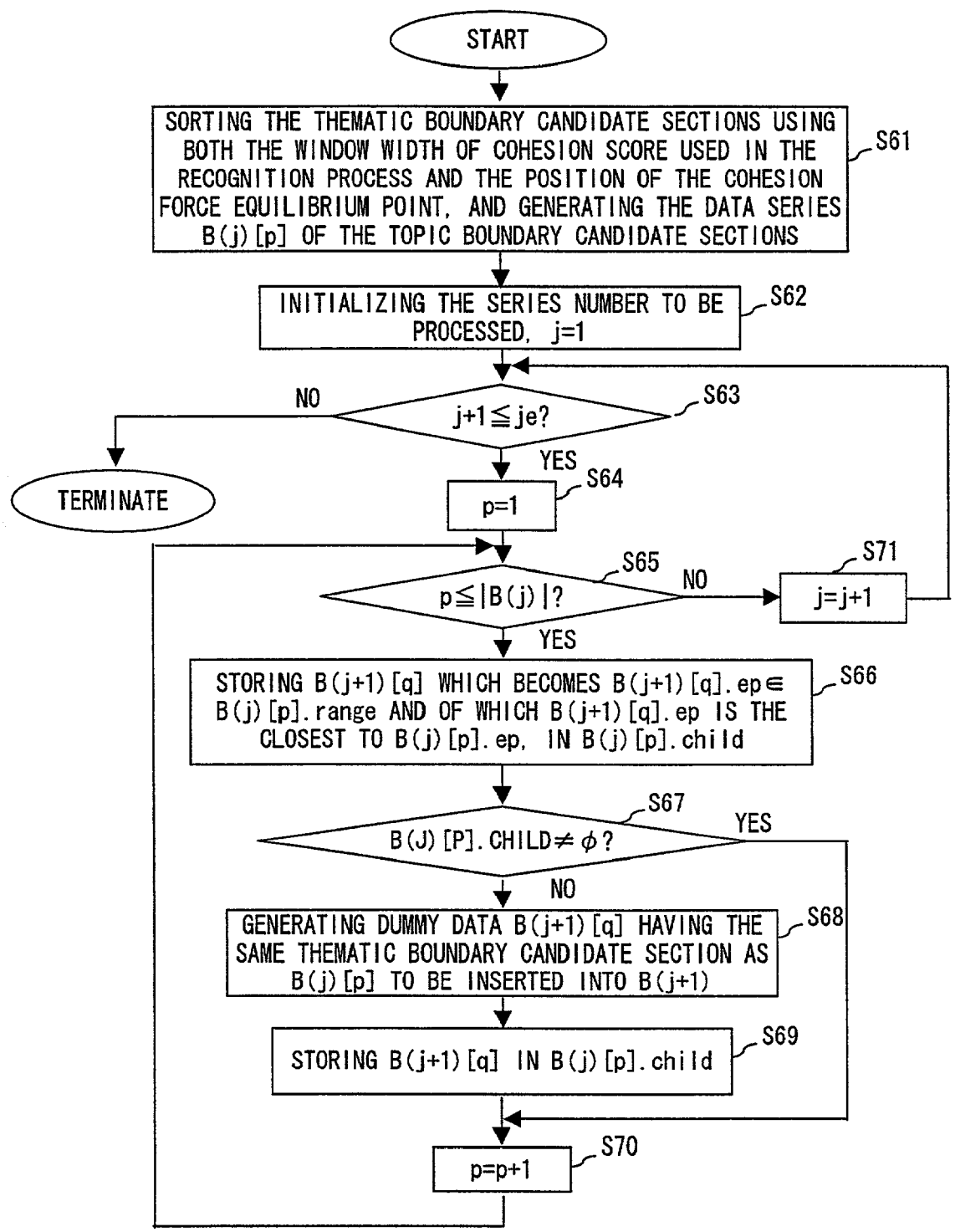
FIG. 17 is a flowchart showing a thematic boundary recognition process.

FIG. 17 is a flowchart showing the thematic boundary recognition process that is carried out in step S45 of FIG. 11. The thematic hierarchy detector 25 sorts the recognized thematic boundary candidate sections using the window width of the cohesion score series and the appearance location in the document of the cohesion force equilibrium point of the thematic boundary candidate section, and prepares the series B(j)[p] of thematic boundary candidate section (step S61).

Here, a control variable j is the series number that shows that the cohesion score series were calculated with window width wj. A control variable p is the data number for each thematic boundary candidate section inside the series. The control variable j takes 1, 2, . . . in order from the largest window width. The control variable p takes 1, 2, . . . in the appearance order of the cohesion force equilibrium point. Each data B(j)[p] includes the following element data.

B(j)[p].range: Thematic boundary candidate section. (a set of a starting position and an end position)

B(j)[p].ep: Cohesion force equilibrium point.

B(j)[p].child: Thematic boundary candidate section (child candidate section) of B(j+1) series that agrees in the range of the thematic boundary candidate section of the boundary location.

A cohesion force equilibrium point is a point theoretically. However, since the point where the sign of the difference between the forward cohesion force and backward cohesion force switches over is recognized as the equilibrium point as mentioned above, the point is actually expressed by a set of the negative point (starting position) and the positive point (end position) Thereupon, the values (forward cohesion force-backward cohesion force) at the starting position lp and the end position rp of the cohesion force equilibrium point are set as DC(lp) and DC(rp), respectively, and a point ep where the cohesion force of the right and left becomes 0 is obtained by interpolating the following equation:

$$ep=(DC(rp)*lp-DC(lp)*rp)/(DC(rp)-DC(lp)) \quad (2)$$

Then, the obtained ep is set as B(j)[p].ep.

Next, the thematic hierarchy detector 25 corresponds the thematic boundary candidate section data having different window width. Here, a plurality of pieces of B(j)[p] that belong to one series are summarized to be described as B(J), and furthermore, the following processes are explained using the following notation.

ie: Series number corresponding to the minimum window width w_min.

|B(j)|: Maximum value of data number p in B(j).

First, series number i indicating the data to be processed is initialized to 1 (step S62). In this way, the series of the thematic boundary candidate section obtained by the maximum window width w1 is set as the data to be processed. As long as j+1≦je, a correlation process of setting B(j+1) as the series to be related to is performed while incrementing j.

In this correlation process, for each thematic boundary candidate section datum B(j)[p] (p=1, . . . , |B(j)|) in the series to be processed, the datum of which B(j+1)[q].ep is the closest to B(j)[p].ep is chosen among data B(j+1)[q] of the series to be correlated with. The chosen datum is stored in B(j)[p] .child as correlated boundary candidate section data.

The concrete procedures are as follows: first, j+1 and je are compared (step S63). If j+1≦je, substitute 1 for p (step S64), and compare p with |B(j)| (step S65). If p≦|B(j)|, correlation processes in and after step S66 are performed. If p exceeds |B(j)|, j=j+1 is set (step S71), and the processes in and after step S63 are repeated.

In step S66, the thematic hierarchy detector 25 selects the data B(j+1) which satisfies the condition B(j+1)[q].ep∈B(j)[p].range and B(j+1)[q].ep is the closest to B(j)[p].ep as the data to be correlated with among the candidate data B(j+1)[q] (q=1, . . . , |B(j+1)|). Then, the selected data is stored in B(j)[p].child.

Here, the condition of B(j+1)[q].ep∈B(j)[p].range shows that the cohesion force equilibrium point of B(j+1)[q] is included in the thematic boundary candidate section of B(j)[p].

Figure 18:
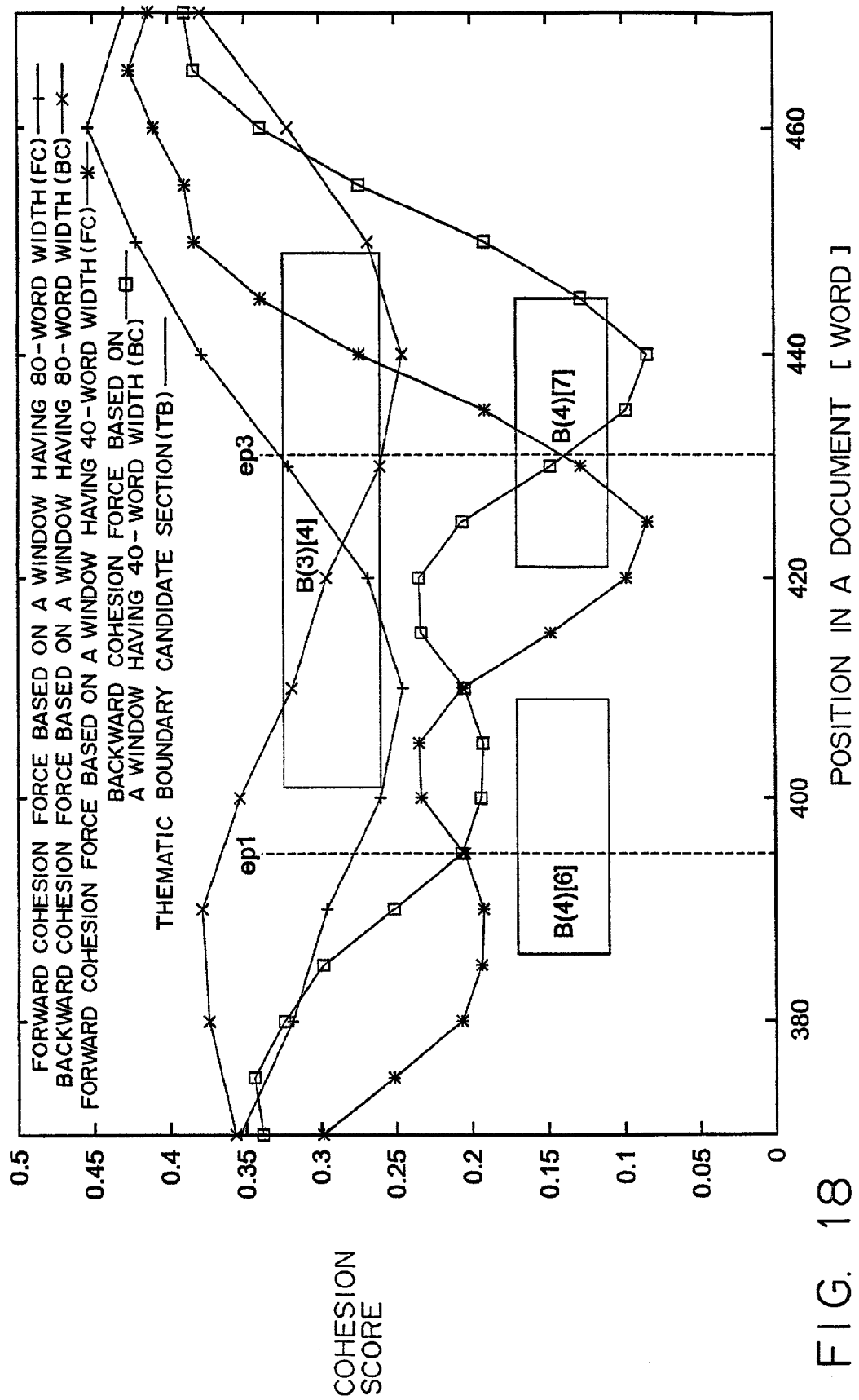

FIG. 18 shows a selection example of data to be correlated with. In FIG. 18, the polygonal line graph plotted by the symbol '+' expresses the series of the forward cohesion force by the window of 80-word width corresponding to the data to be processed. The polygonal line graph plotted with the symbol '×' shows the series of the backward cohesion force by the window of 80-word width. The polygonal line graph plotted with the symbol '*' shows the series of the forward cohesion force by the window of 40-word width corresponding to the data to be processed. The polygonal line graph plotted with the symbol '□' shows the series of the backward cohesion force by the window of 40-word width. Further, the area shown by a rectangle corresponds to the thematic boundary candidate section, and ep1 and ep3 that are shown with the dotted line correspond to the equilibrium point of the cohesion force by the window of 40-word width.

For example, when the datum to be processed is set as B(3)[4], there are cohesion force equilibrium points of ep1 and ep3 in the vicinity, and there are two pieces of data B(4)[6] and B(4)[7] of the series to be correlated with corresponding to the data to be processed. Among these, since the cohesion force equilibrium point ep3 of B(4)[7] is included in the thematic boundary candidate section (rectangle of the upper part) of B(3)[4], B(4)[7] is selected as a datum to be correlated with.

Next, the thematic hierarchy detector 25 determines whether the datum to be correlated with is selected (step S67). In the case that the datum to be correlated with is selected, p=p+1 is set (step S70), and the processes in and after step S65 are repeated.

If the datum to be correlated with which satisfies the condition is not detected, a dummy datum B(j+1)[q] which has the same thematic boundary candidate section as B(j)[p] is prepared to be inserted into the series of B(j+1) (step S68).

In step S68, the value of B(j)[p].range and B(j)[p].ep are set to B(j+1)[q].range and B(j+1)[q].ep, respectively, and a new datum B(j+1)[q] is prepared. The prepared datum B(j+1)[q] is inserted into a location where the prepared datum becomes B(j+1)[q−1].ep<B(j+1)[q].ep and B(j+1)[q].ep<B(j+1)[q+1] .ep in the series B(j+1).

In this way, a data number q of the dummy datum is decided, and the data number of the subsequent existing data is rewritten.

Next, the prepared dummy datum B(j+1)[q] is stored in B(j)[p].child (step S69), the processes in and after step S70 are performed. And, if j+1 exceeds je in step S63, the processes terminate.

Finally, for each datum B(j)[p] of all the series number j that is smaller than je, the data of series number j+1 that has the cohesion force equilibrium point in the thematic boundary candidate section B(j)[p].range is set in B(j)[p].child. Therefore, the thematic boundary candidate section data of a plurality of hierarchies is correlated with each other in a chain expressed by B(j)[p].child.

Figure 19:
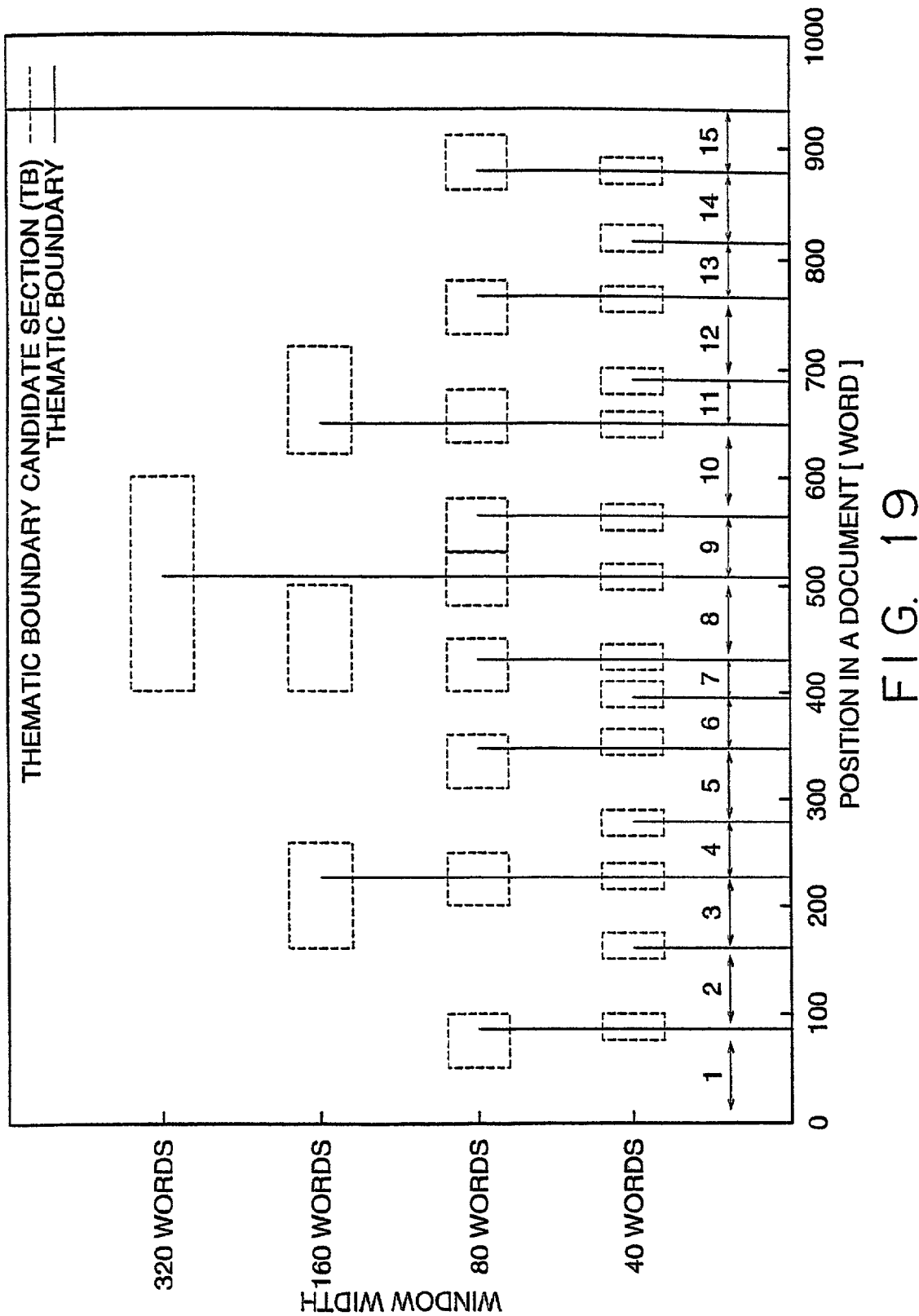
FIG. 19 is a graph showing the recognition result of the thematic boundary.

FIG. 19 shows the recognition result of the thus-obtained thematic boundary. In FIG. 19, the bar chart expresses the final topic boundary of the topic of the grading corresponding to each window width (the ordinates), in other words, the location of the cohesion force equilibrium point of the minimum window width (40 words). The rectangular area that intersects the bar chart expresses the thematic boundary candidate section that is recognized by the cohesion force of each window width.

In step S46 of FIG. 11, the thematic boundary shown in FIG. 19 is finely controlled and is matched with the starting position of the sentence, thereby preparing a thematic hierarchy such that one topic is set between the boundaries. Thus, part of the thematic boundary of FIG. 19 is shifted by this fine control, and consequently the thematic hierarchy of the tree-structure as shown in FIG. 20 is formed.

Figure 20:
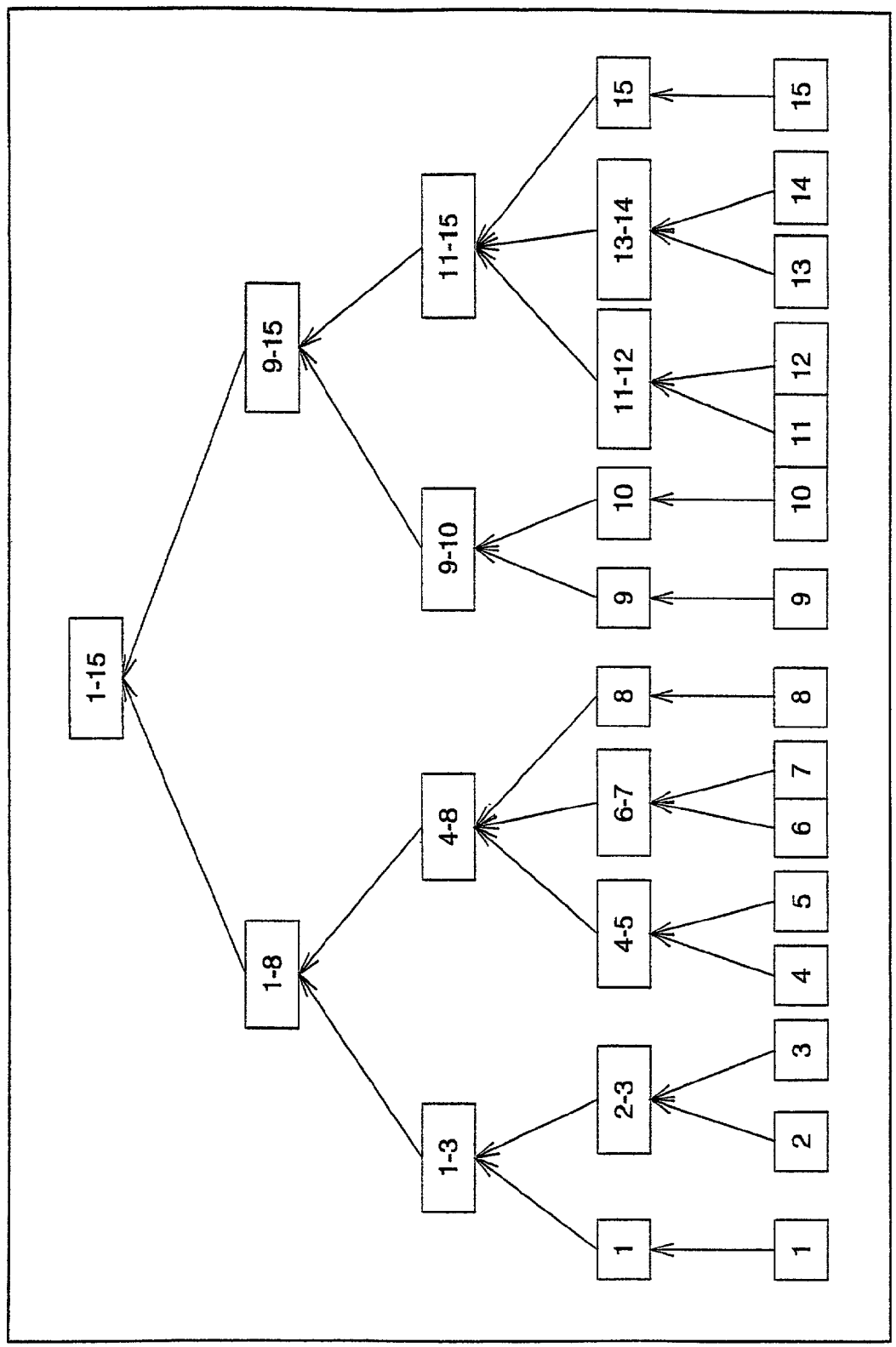
FIG. 20 is a chart showing the thematic hierarchy of the first document to be read.
Figure 21:
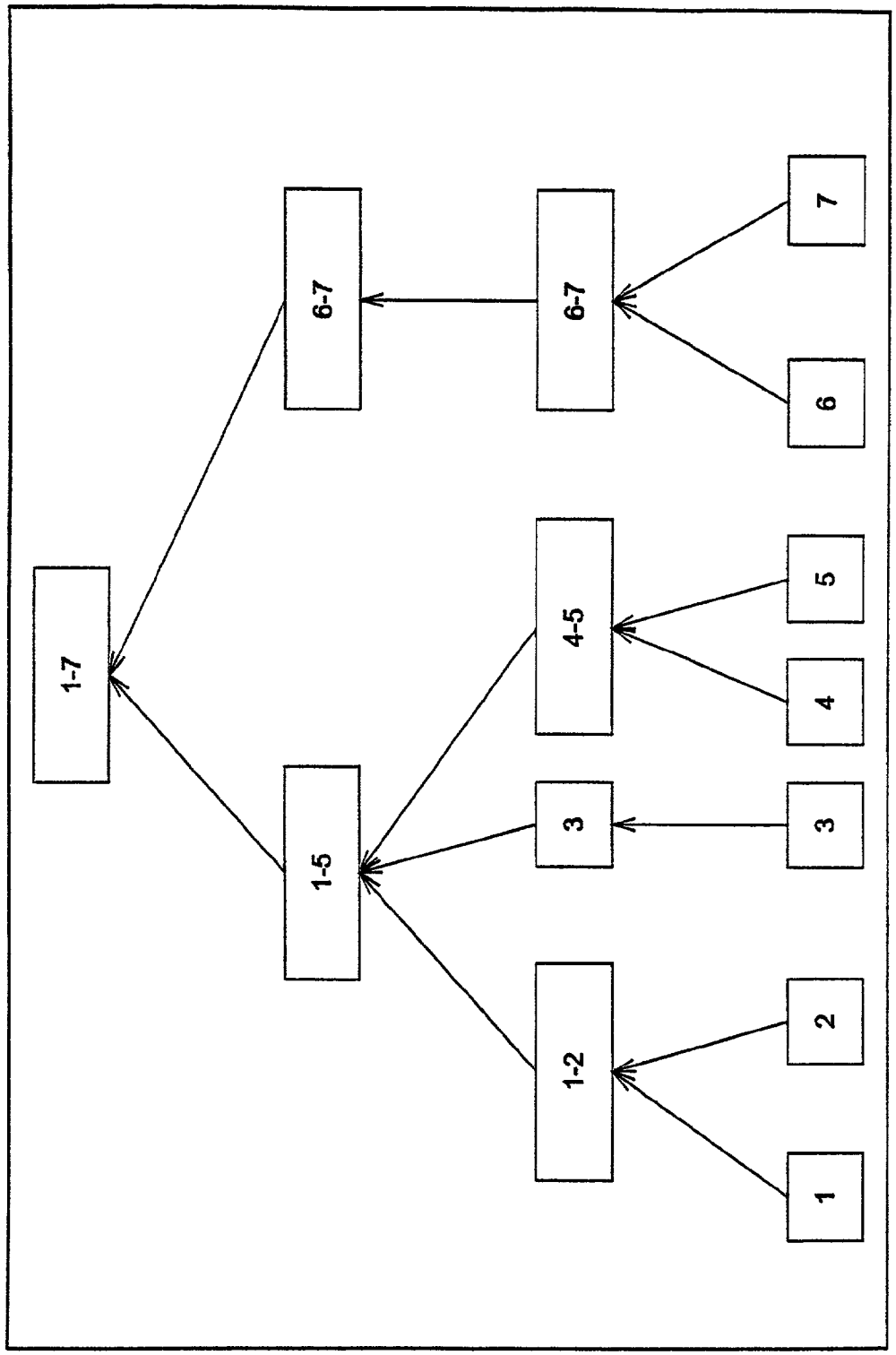
FIG. 21 is a chart showing the thematic hierarchy of the second document to be read.

In the thematic hierarchy of FIG. 20, the node that is expressed with a rectangle corresponds to each recognized topic, and the number inside the rectangle corresponds to the division number shown in FIG. 19. Further, the thematic hierarchy shown in FIG. 21 is formed by performing the same process of the second document to be read.

Figure 22:
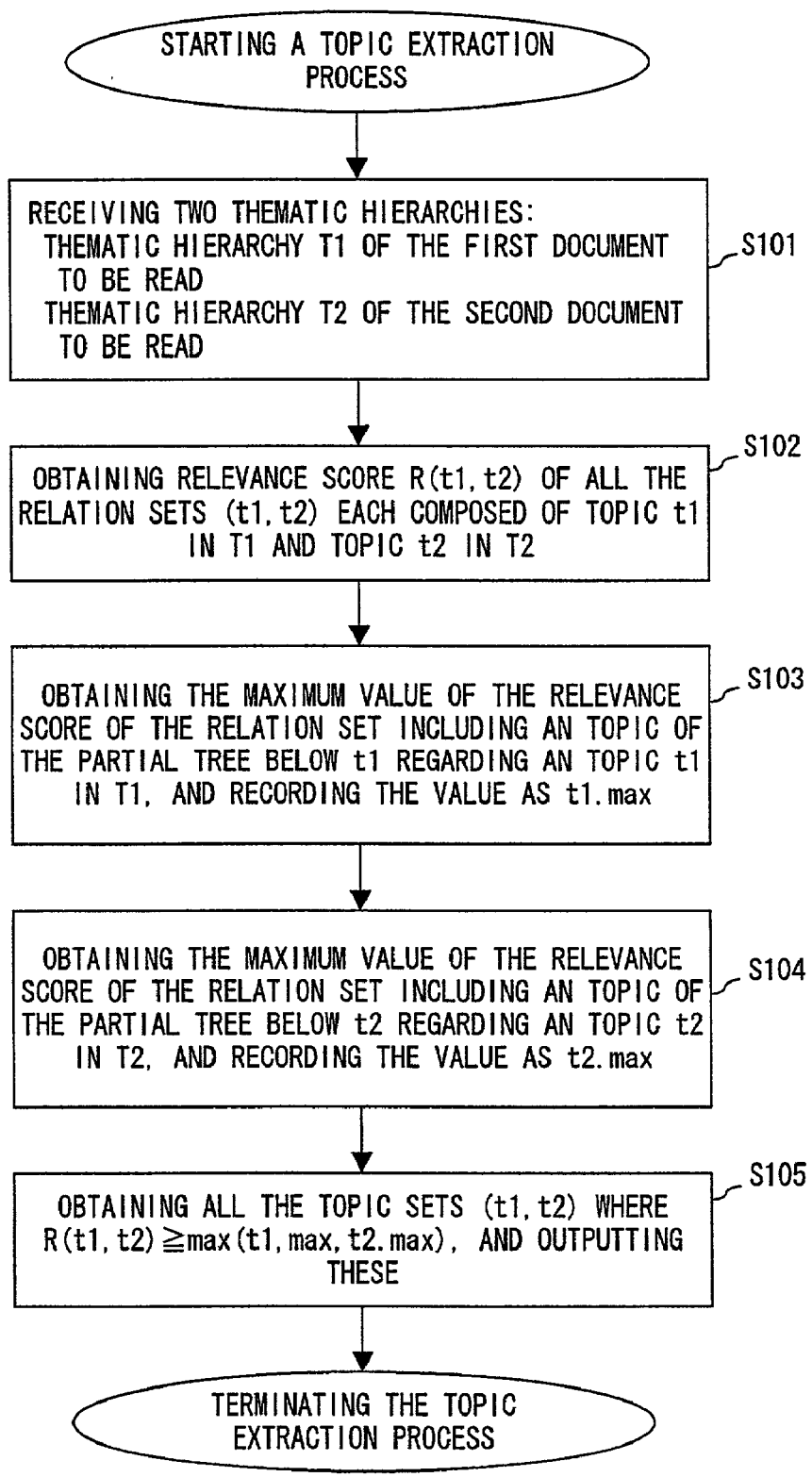
FIG. 22 is a flowchart showing a topic extraction process.

Next, the process of the topic extractor 27 is explained. FIG. 22 is a flowchart showing the topic extraction process performed by the topic extractor 27. The topic extractor 27 receives two thematic hierarchies T1 and T2 of the first and the second documents to be read (step S101). Then, it calculates the relevance score regarding all the topic sets (t1, t2) of a topic t1 in the thematic hierarchy T1 and a topic t2 in the thematic hierarchy T2 (step S102).

In the present embodiment, the relevance score R (t1, t2) between the topics t1 and t2 is obtained by the similarity of the vocabulary that is included in divisions s1 and s2 corresponding to t1 and t2, respectively. Specifically, R(t1, t2) is calculated by the following equation:

$$R(t1, t2) \equiv R(s1, s2) = \frac{\sum_t W_{t,s1} W_{t,s2}}{\sqrt{\sum_t W_{t,s1}^2 \sum_t W_{t,s2}^2}} \quad (3)$$

Here, $W_{t,s1}$, $W_{t,s2}$ respectively express the weight that indicates the importance of word t in divisions s1 and s2, and is calculated by the following equation:

$$W_{t,s} = tf_{t,s} \times \log\left(\frac{|D|}{df_t}\right) \quad (4)$$

In equation (4), $tf_{t,s}$ expresses the appearance frequency of word t in division s. |D| expresses the number of blocks that are obtained by dividing the document including division s for each fixed width (80 words), and $df_t$ shows the number of blocks where the word t appears.

The equations (3) and (4) comprise a variation of a calculation method called tf·idf method to be used for the calculation of a query-document relevance score in the information retrieval field. According to the tf·idf method, the part $|D|/df_t$ of the equation (4) is calculated in the units of documents that are included in the document collection to be retrieved not in the units of divisions inside a document. That is, when |D| is set as the number of documents in the document collection to be retrieved and $df_t$ is set as the number of documents where the word t appears, these equations become equivalent to the general calculation equation of tf·idf method.

The relevance score R(t1, t2) maybe obtained using the tf·idf method. However, since the relevance score can be calculated only from the document to be read according to the equations (3) and (4) of the present embodiment, and also the effective result can be obtained by these calculation equations, as described later, these calculation equations are selected here.

Next, the topic extractor 27 calculates threshold values used for the selection of a topic set from all the combinations of topics t1 and t2 of the first and the second documents to be read. As the threshold, for example, the maximum relevance score of the subtree below a topic is used. Here, the maximum relevance score in the subtree below a certain topic t is the maximum value of the relevance score that is calculated for t or the descendant of t (any smaller topics that compose t) in the thematic hierarchy.

The topic extractor 27 first obtains the maximum relevance score for topic t1 and records it on t1.max (step S103). It then similarly records the maximum relevance score on t2.max regarding topic t2 (step S104) Then, the unit obtains a set of topic pairs T that are defined by T≡{(t1, t2)|R(t1, t2)≧max (t1.max, t2.max), outputs it as the common topics (step S105), and terminates the process.

Figure 23:
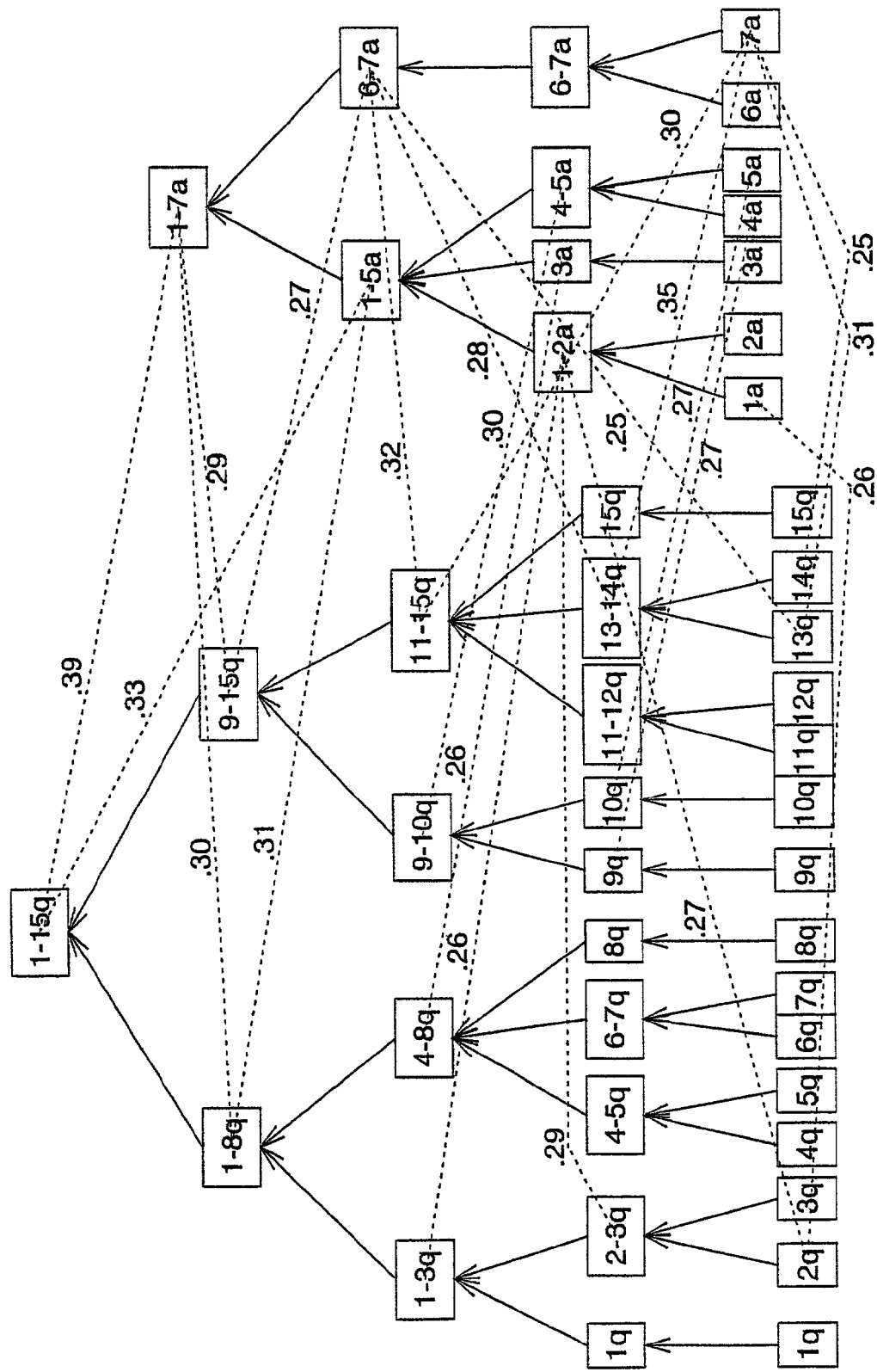
FIG. 23 shows the calculation result of a relevance score.
Figure 24:
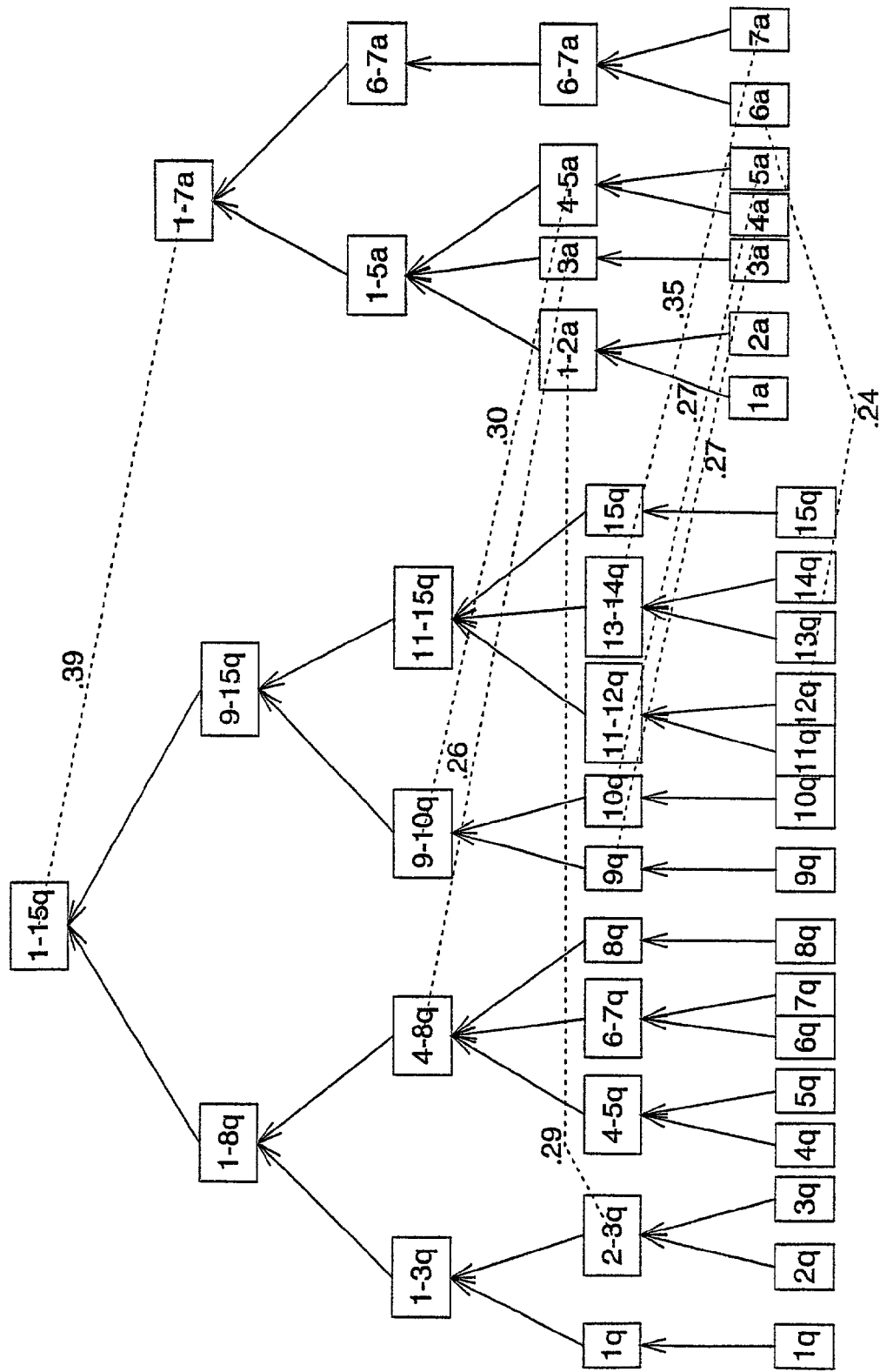
FIG. 24 shows an extraction result of the common topic.

A specific example of the topic extraction process based on the maximum relevance score is explained using FIGS. 23 and 24. FIG. 23 shows the calculation result of relevance scores in step S102 of FIG. 22. Here, all topic pairs with a relevance score 0.25 or more are shown with the dotted arc. The numerical value attached to the arc shows a relevance score. The left graph of the two tree-structure graphs corresponds to the thematic hierarchy of FIG. 20 while the right graph corresponds to the thematic hierarchy of FIG. 21.

Note node 7a at lower right corner in the right graph. Since node 7a is a leaf node in the graph, the maximum relevance score of the subtree below node 7a is the one of those attached to the links directly connected to node 7a. In this case, the link between node 13-14q and node 7a has the maximum score 0.35, and no other links with a score greater than 0.35 exists in the subtree below node 13-14q. Thus, the node pair of (node 13-14q, node 7a) is extracted as a common topic.

As for node 6-7a, since it is the parent (and ancestor) node of node 7a, a link directly connected to node 6-7a is not selected unless its relevance score exceeds the maximum score concerning node 7a (0.35). There is no such link. Thus, no node pair including node 6-7a is extracted as a common topic.

In this way, eight pairs of topics (depicted by the solid lines) are extracted in FIG. 24. Seven pairs of topics, other than the one that corresponds to the relation between the entire documents, cover most parts of these two documents. Those nodes that do not belong to any topic pairs are three nodes of node 1q, node 11q, and node 15q. Among the passages corresponding to them, the ones corresponding to node 1q and node 11q do not describe question items directly. They describe background information for successive question item. Accordingly, the only question item that was not extracted corresponds to node 15q.

In this example, node 9q and node 10q are extracted twice as consistent nodes of related node pairs. That is, node 9q belongs to two pairs, (node 9-10q, node 4-5a) and (node 9q, node 4a), and node 10q belongs to two pairs, (node 9-10q, node 4-5a) and (node 10q, node 5a). As seen in the result shown in FIG. 25 that will be described later, these three pairs are not redundant because they all correctly correspond to existing question-answer pairs in the documents as follows. In the first document, node 9q corresponds to the part where the interpellator points out the bad influence of the mass media on children, and node 10q is the part that proposes to establish a law to protect children from harmful information. Node 4a corresponds to the prime Minister's reply for node 9q that he recognizes the problem, and node 5a is the answer for node 10q that explains the policy for establishment of the law regarding harmful information. In this way, the (node 9-10q, node 4-5a) pair corresponds to a relation between larger thematic units in the first and second documents, and the (node 9q, node 4a) and (node 10q, node 5a) pairs correspond to relations between smaller thematic units.

In this way, according to the present embodiment, an appropriate set of related topics can be selected neither excessively nor insufficiently without establishing a special threshold in advance, by selecting the common topic utilizing the thematic hierarchies.

Next, for each topic pair that is extracted by the topic extractor 27, the output unit 28 takes out a passage corresponding to the topic pair from each document to be read and outputs the taken-out passages. For example, regarding the topic pair of relevance score 0.30 of (node left 9-10q, node right 4-5a) of FIG. 24, division 9 and division 10 in the first document to be read are extracted corresponding to the topic of node 9-10q, and division 4 and division 5 in the second document to be read are extracted corresponding to the topic of node 4-5a. Then, the divisions are arranged in such a way that a user can easily contrast them and the thus-rearranged divisions are output.

FIG. 25 shows an example of the output result of the related passages for this topic pair. In the output example of FIG. 25, the left column shows a passage of the first document and the right column shows a passage of the second document. Each passage is divided into in the units of minimum topics (minimum division) that is recognized by the thematic hierarchy detector 25. The words emphasized with a boldface are those words that appear in both the columns and have relatively high importance calculated by the equation (4). Specifically, these words are extracted with the following procedures.

The words that appear in both related passages are first extracted as important word candidates. For each extracted word, the value of the equation (4) in each passage is obtained as the importance of each word. Then, important words are extracted in the order of importance until the accumulated value of the importance of the extracted words exceeds ½ of the total value of the importance of the whole candidates.

The related passages shown in FIG. 25 are the portion extracted twice. In this portion, not only a topic pair in an upper layer (node 9-10$q$, node 4-5$a$) but also two topic pairs (node 9$q$, node 4$a$) and (node 10$q$, node Sa) are extracted as common topics.

As seen in the contents shown in FIG. 25, it is conceivable that the answer to the question of node 9$q$ is node 4$a$, and the answer to the question of node 10$q$ is node 5$a$. The strong relevance can be recognized between the node 9$q$ and node 10$q$, and the node 4$a$ and node 5$a$.

Therefore, although these portions are repeatedly extracted, it is understood that they are not redundant but express important correspondences. Thereupon, in FIG. 25, the starting positions of the topics that correspond to each other are aligned to be output so as to contrast not only the two sets of topics but also the individual topics.

Further, the output unit 28 can also improve the taking-a-look efficiency by summarizing and displaying the contents of the related passage. If, the technology disclosed in, for example, above-mentioned Japanese patent laid-open Publication No. 11-272,699 is used, a concise summary that includes a lot of important words extracted with the above-mentioned procedures can be prepared.

Figure 26:
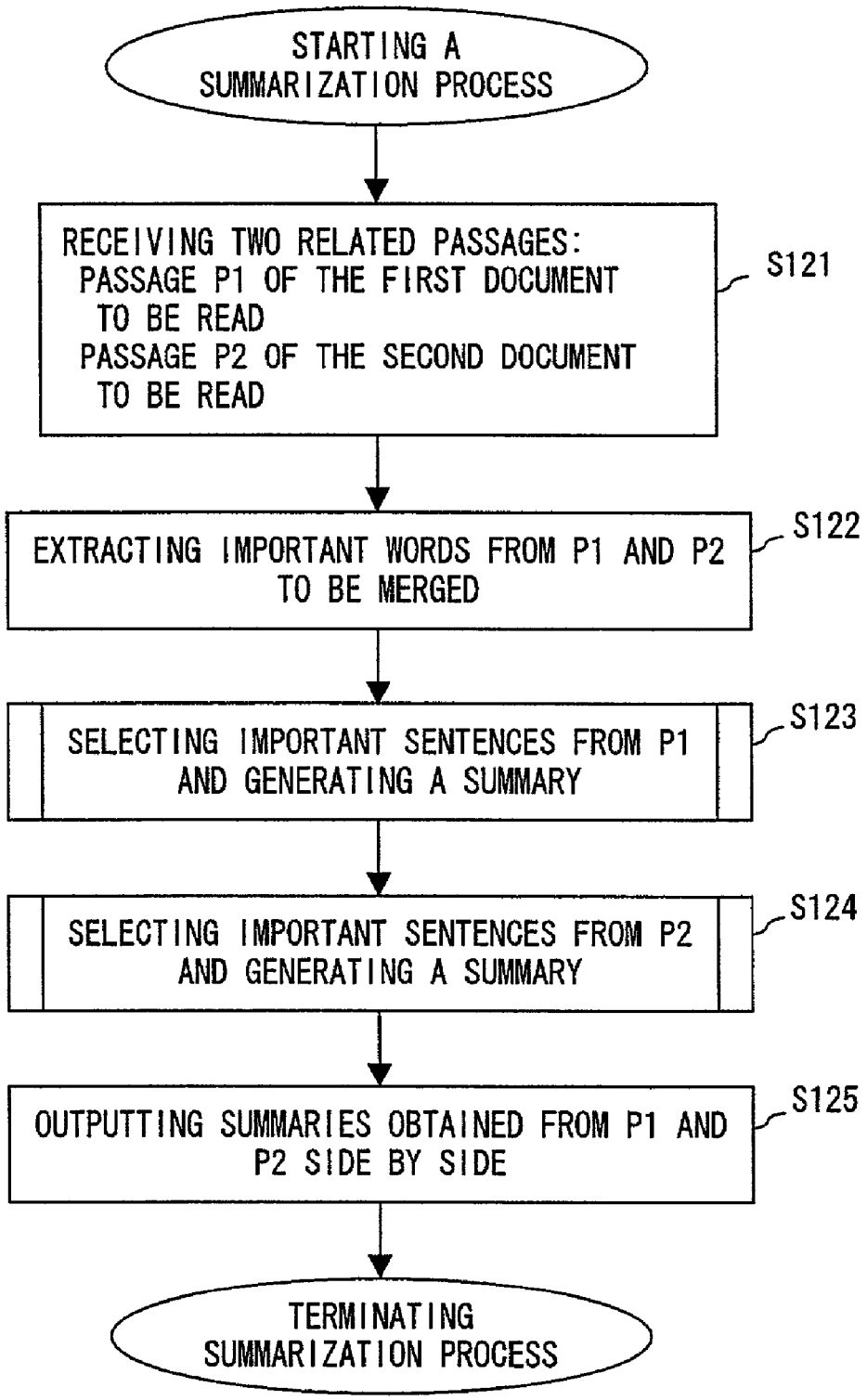
FIG. 26 is a flowchart showing a summarization process.

FIG. 26 is a flowchart showing the simplified procedures of such a summarizing process. The output unit 28 first receives a passage P1 that is taken out from the first document and a passage P2 that is taken out from the second document corresponding to a common topic (step S121). Then, the output unit 28 extracts important words from each of the passages P1 and P2, and merges those important words (step S122).

Next, the output unit 28 selects important sentences from the passage P1 and generates a summary (step S123), and similarly generates a summary from the passage P2 (step S124). Then, the unit arranges the summaries so as to be easily compared, and outputs the summaries side by side (step S125), thereby terminating the processes.

FIG. 27 is a flowchart showing the important sentence selecting process performed in steps S123 and S124 of FIG. 26. In this process, the output unit 28 first sets P1 or P2 at a target part p, and sets the important word extracted in step S122 in an important word list KWL as the clue of an important sentence (step S131). Then, the output unit 28 selects the sentence that with the most number of important words from the target part P (step S132), and determines whether the sentence can be selected (step S133).

In the case that the sentence can be selected, the important words included in the selected sentences are removed from KWL (step S134), and determines whether KWL is empty (step S135). If KWL is not empty, the processes in and after step S132 are repeated. Then, the processes terminate when at least one important sentence can be selected for all the important words. The output unit arranges the selected sentence in the order of appearance in the original document, and outputs the sentence as a summary (step S136), thereby terminating the processes.

In the case that it is not able to select a sentence in step S133, the process is terminated and the process in step S136 is performed. By performing the processes shown in FIGS. 26 and 27, summaries shown in FIGS. 28, 29, and 30 are prepared.

In this way, not only by separately presenting the related passages corresponding to an individual common topic, but also by summarizing the related passages, a list of related passages can be output in such a way that a user can easily take a look. Therefore, even if many common topics are extracted at once, the output unit can effectively support the comparison/reading work.

Figure 31:
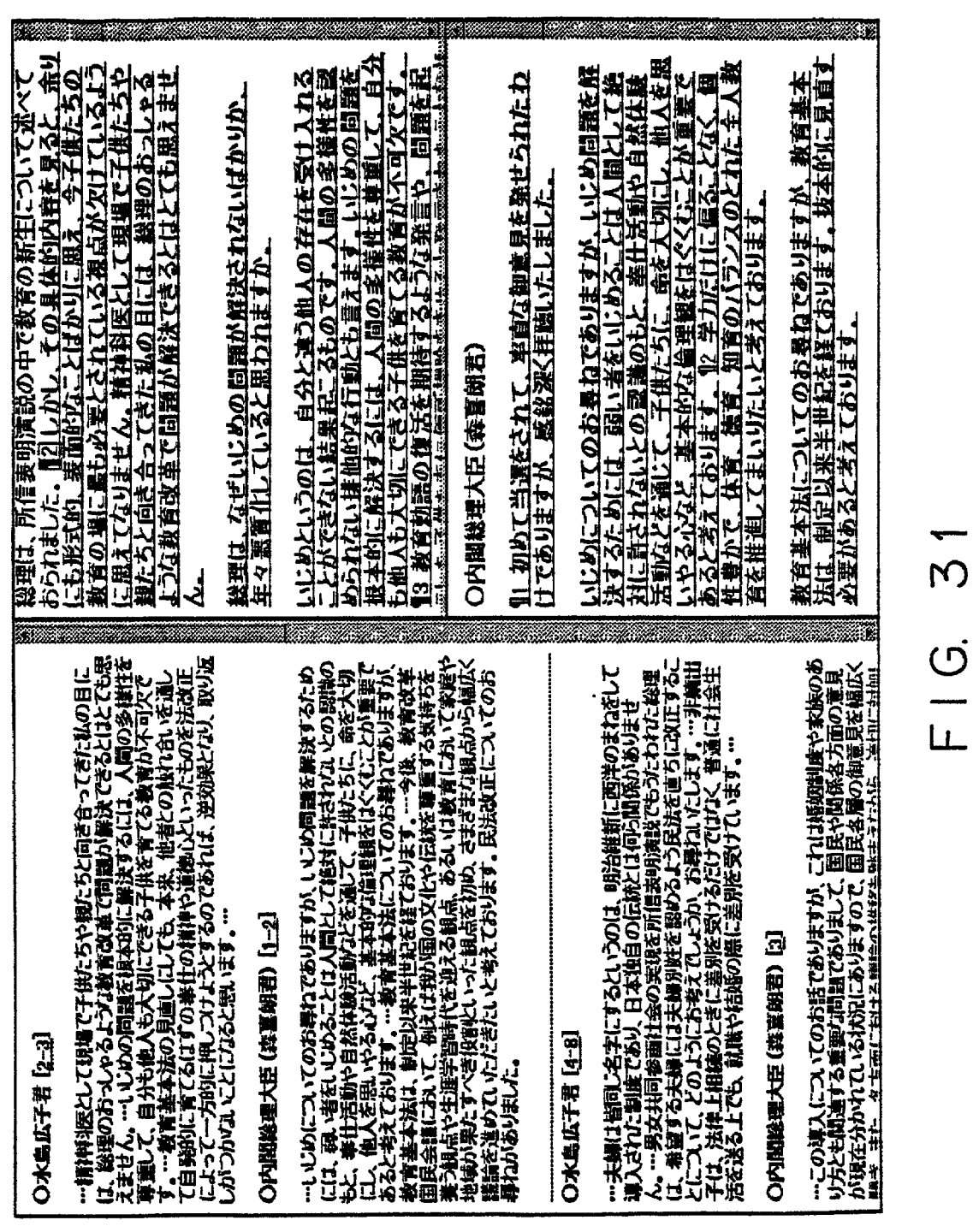

Further, the output unit 28 can support the work of analyzing the related documents by displaying related passages with the original documents side by side. In this case, it is sufficient to display the summaries of passages and the original documents as shown in FIG. 31. Further, the reading efficiency can be enhanced more, if a hyper-link is provided between a passage and the corresponding part of the original document.

In FIG. 31, the left frame is the window for the reference of related passages. The right frame is the window for the reference of original documents. In the left frame, the prepared summaries of the extracted passages are displayed, and the anchor of the hyper-link for the target part of the original document is established in the key-parentheses (underlined part) after the speaker's name. By designating the anchor by a user as occasion demands, the designated part of the first document to be read is displayed on the upper right window, and the designated part of the second document to be read is displayed on the lower right window.

In the document to be presented in the right frame, the related portions are highlighted with an underline, so that the related portions can be distinguished from the context before or after. As for the method of highlighting display, colour display, hatching, etc. can be used. In this example, the summaries of the extracted passages are displayed in the left frame. Instead, the extracted passages themselves may be displayed. Further, it is conceivable that the output unit 28 can switch the presentation of the summary of the passage with the presentation of the whole contents of the passage, or the reverse, according to the request from a user.

Figure 32:
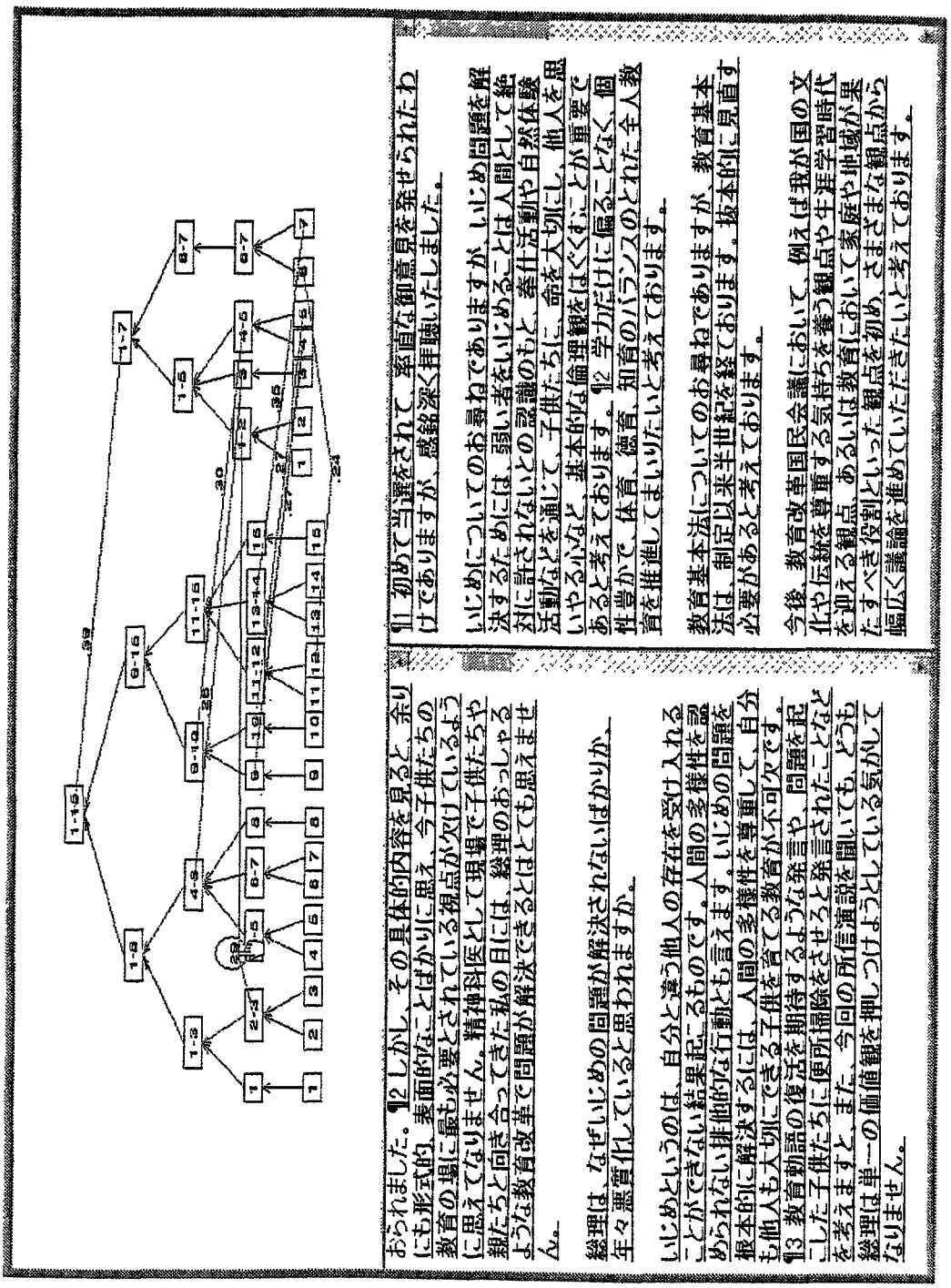
FIG. 32 shows an example of the topic relation presentation with a graph.

Further, the output unit 28 displays the relationship among the topics that appear on the both documents with a drawing sheet using a graph, so that a user can understand the whole relevance between the documents to be read with a glance. FIG. 32 shows an example of that presentation.

In FIG. 32, the thematic hierarchies of two documents are displayed at the top frame in a graph similar to that shown in FIG. 24. At the bottom frame, the first and second documents are displayed side by side. At the graph of a thematic hierarchy, arcs that show the related topic pairs are added, and each arc is provided with a hyper-link for synchronizing a topic pair and both original documents. Further, at each node corresponding to an extracted passage, a hyper-link for the corresponding part of each document is provided. The related part of each document is highlighted similarly to that of FIG. 31. In this way, the understanding of the general relevance between the documents to be read is promoted.

In the above-mentioned embodiment, the case where two documents to be read are present is mainly explained, but the comparison/reading for three or more documents can be as well supported by applying this process. In this case, the above-mentioned process can be also performed, for example, by setting any one of the documents as the reference (axis) and comparing other documents, or by performing the process like the above-mentioned to all the combinations of the documents to be read, and then by arranging and integrating the extracted passages with any means, thereby outputting the integrated topics.

FIG. 33 shows an example where all of the eight cases of the representative questions (excluding the answer) included in the above-mentioned "the 149th House of Representatives plenary session minutes No. 2" are compared with the policy speech of the prime minister in "the 149th House of Representatives plenary session minutes No. 1" (on Jul. 28, 2000).

In FIG. 33, the left column corresponds to the summary of the related passage of the reference document, the central column corresponds to the summary of that of the first document, and the right column corresponds to that of the other document. Here, only the part related to the first document to be read is shown as an example, but it is similarly possible to correspond the representative question made by the other questioner to the appropriate part of the reference document.

Furthermore, such a related passage is combined with the reference document to be outputted. In this way, the preparation of the integrated document such as "point of the policy speech and the view of each party representative to the speech" can be supported.

Figure 34:
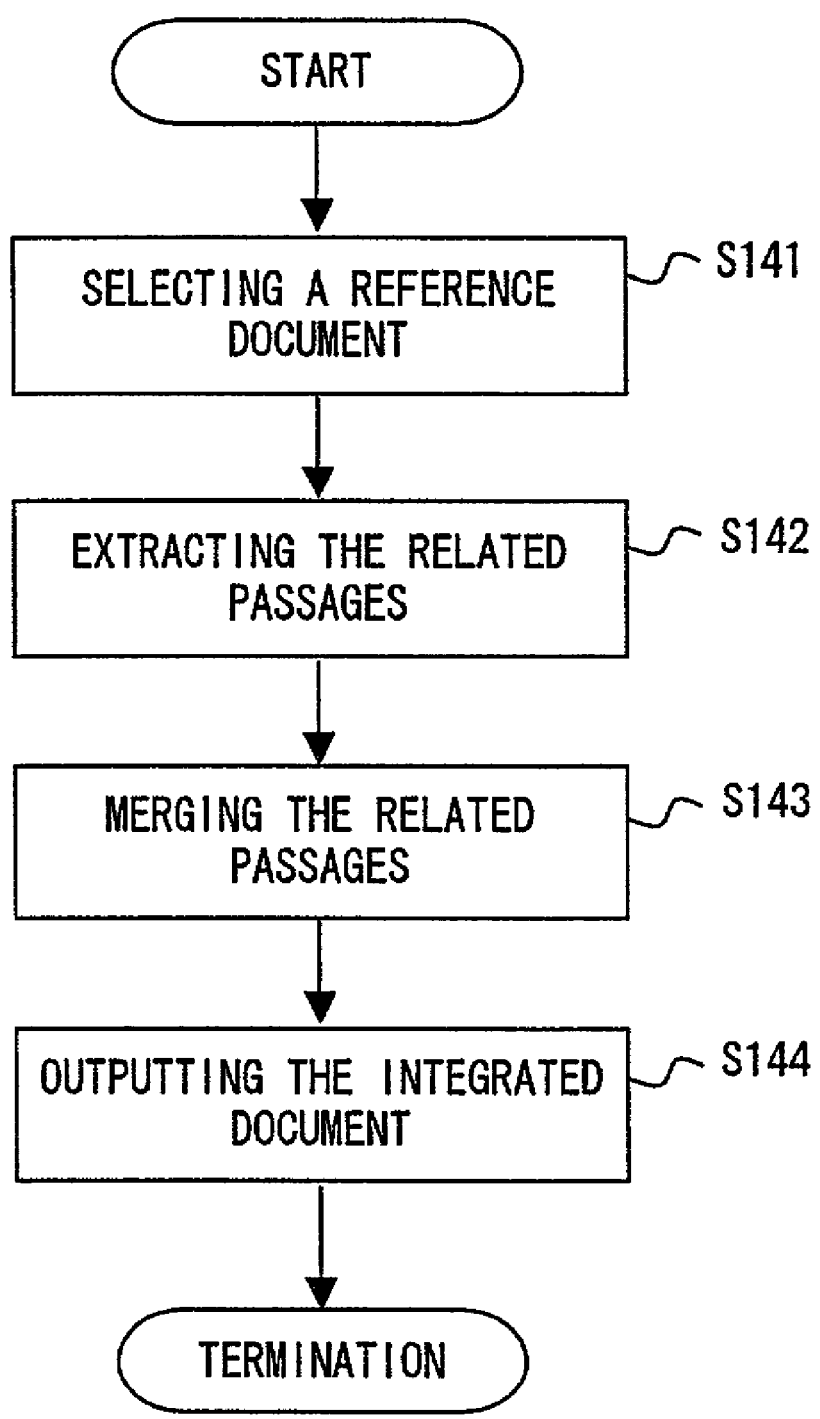
FIG. 34 is a flowchart showing a document integration process.

FIG. 34 is a flowchart of such a document integration process. The document reading apparatus firstly selects a reference document among from a plurality of documents to be read on the basis of the instructions, etc. from a user (step S141), and extracts the passages of the other document related to the reference document (step S142). Then, the output unit 28 merges the extracted passages in the appearance order of the reference document, prepares an integration document (step S143), outputs the document (step S144), and terminate the processes.

The process of English document is explained exemplifying the case where two communications by G8 such as the Kern summit in 1999 and the Okinawa summit in 2000 are targeted. Here, "G8 COMMUNIQUÉ KÖLN 1999" is set as the first English document to be read, and "G8 COMMUNIQUÉ OKINAWA 2000" is set as the second English document to be read.

All the sentences of these documents are composed of 4500 words and 7000 words individually. Since it is too long to describe all the processing results in the present specification and drawings, only the half is processed in the following. In the first document to be read composed of ten paragraphs as a whole, the following five paragraphs (1800 words) are to be processed, while in the second document to be read, the following one part (3500 words) that is located next to the preamble is to be processed.

(1) Part to be Processed of the First Document to be Read

I. Getting the World Economy on Track for Sustained Growth
II. Building a World Trading System That Works for Everyone
III. Designing Policies for More Employment
IV. Investing in People
V. Strengthening Social Safeguards (2) Part to be Processed of the Second Document to be Read Toward a 21St Century of Greater Prosperity Further, the following processing method and parameters are adopted here.

(1) Method of word recognition: Method using a stop word List
(2) Width of the window for cohesion score calculation:
Minimum window width: w_min=80 (word)

Maximum window width w1: The number of words of the value that is equal to a product obtained by multiplying w_min with 2**n (n-th power of 2) and does not exceed the half of all the documents Interval width: ⅛ of window width FIG. 35 shows the leading part of the first document to be read. FIG. 36 shows the processing result of tokenizer 22 for the part. In FIF. 36, a part enclosed with [ ] corresponds to the recognized word. The word of which only the leading letter is capitalized is rewritten into all the small letters in the [ ].

In this case, the tokenizer 22 takes out words with clues of a space and delimiter symbols such as ",", ".", ":", ";", etc., and removes the words that are included in the stop word list as shown in FIG. 37, thereby recognizing the words. The stop word list is a list for defining in advance words such as articles, prepositions, etc., that are not to be extracted as important words.

Figure 38:
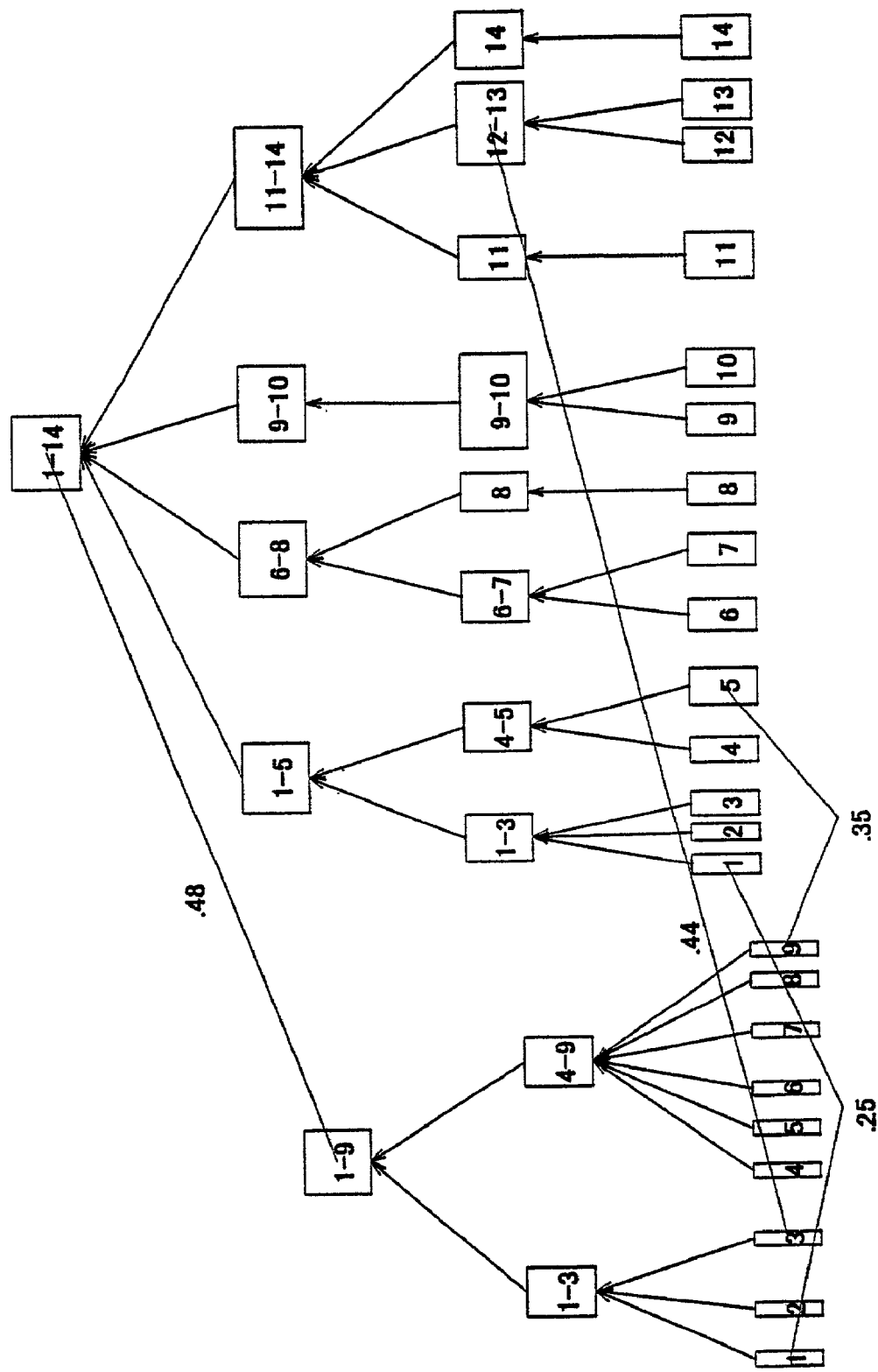
FIG. 38 is a chart showing the extraction result of related topic for English documents.

FIG. 38 shows the extraction result of the common topic for the above-mentioned document set. In FIG. 38, the left tree-structure graph corresponds to the output of the thematic hierarchy detector 25 for the first English document to be read, that is, corresponds to the recognition result of the thematic hierarchy of the first English document to be read. The right tree-structure graph corresponds to the recognition result of the thematic hierarchy of the second English document to be read. Also, the arc between these tree-structure nodes show the related topic set that is extracted by the topic extractor 27.

After the output unit 28 summarizes the thus-extracted related topics using the procedures of FIGS. 26 and 27, the summaries shown in FIGS. 39, 40 and 41 are obtained.

Like this, the present invention is applicable to the English document similarly to the Japanese document. Further, the present invention can be applied to the document written in any language or in any form, and can obtain approximately the same result.

Since according to the present invention, the topics of various grading in a plurality of documents to be read are compared using the thematic hierarchy of an individual document to be read, the common topic of which the description amount largely differs from document to document can be extracted appropriately. Also, the passage corresponding to the extracted topic can be taken out from the respective documents to be read, and the passages can be outputted side by side. Therefore, the related passages can be easily analyzed and compared. Thus, the present invention can effectively support the comparative reading work of a plurality of documents.

What is claimed is:

1. A document reading apparatus presenting a plurality of documents designated as reading documents by a user, comprising:

information processor having a memory, including
a thematic hierarchy recognizing device recognizing a thematic hierarchy of each of the plurality of documents:
by repeating a process for detecting a set of thematic boundaries in each layer of the thematic hierarchy, with each of a plurality of different window widths, wherein each of the thematic boundaries is detected based on a lexical cohesion score obtained from a similarity of vocabularies that appear in two adjacent windows with each of the window widths at each location in each of the plurality of documents, and
by correlating first and second thematic boundaries locating closely and detected with smaller and larger window widths, respectively;

a topic extracting device extracting a topic that commonly appears in the plurality of documents based on the thematic hierarchies recognized; and a topic relation presenting device taking out a description part corresponding to the topic extracted from each of the plurality of documents and outputting the description parts taken out as related passages among said plurality of documents, wherein regarding a topic set that comprises topics of various grading in the thematic hierarchies recognized, the topic extracting device calculates a relevance score between topics of the topic set based on lexical similarity of description parts corresponding to each topic of the topic set, and extracts a topic set having a relevance score equal to or more than a threshold that is set based on inclusive relationship of topics, and the threshold, corresponding to any topic among topics which constitutes a target extraction of topic set, is a maximum value of calculated relevance score related to a topic which is included in a subtree in thematic hierarchies.

2. The document reading apparatus according to claim 1, wherein the topic relation presenting device presents the description parts taken out side by side.

3. The document reading apparatus according to claim 2, wherein the topic relation presenting device presents the related parts and original documents in two windows, one of the windows including the related parts side by side and the other including the original documents side by side.

4. The document reading apparatus according to claim 2, wherein the topic relation presenting device presents summaries of the related parts.

5. The document reading apparatus according to claim 4, wherein the topic relation presenting device presents summaries of the related parts and original documents in two windows, one of the windows including the summaries side by side and the other including the original documents side by side.

6. The document reading apparatus according to claim 2, wherein the topic relation presenting device presents a plurality of thematic hierarchies corresponding to the plurality of documents and a correspondence relationship between the plurality of thematic hierarchies based on the plurality of common topics in a drawing, and presents a designated part of the plurality of documents in accordance with an instruction from the user given on the drawing.

7. The document reading apparatus according to claim 1, wherein the topic relation presenting device sets one document among the plurality of documents as a reference document, produces a new integrated document by merging contents of the reference document with description parts of another document related to the reference document, and outputs the integrated document.

8. The document reading apparatus according to claim 1, wherein the thematic hierarchy recognizing device determines the thematic hierarchy according to topic-subtopic relations between topics.

9. A non-transitory computer-readable storage medium encoded with a program for a computer that presents a plurality of documents designated as reading documents by a user, the program upon execution causing the computer to perform a method comprising:

recognizing a thematic hierarchy of each of the plurality of documents:

by repeating a process for detecting a set of thematic boundaries in each layer of the thematic hierarchy, with each of a plurality of different window widths, wherein each of the thematic boundaries is detected based on a lexical cohesion score obtained from a similarity of vocabularies that appear in two adjacent windows with each of the window widths at each location in each of the plurality of documents by correlating first and second thematic boundaries locating closely and detected with smaller and larger window widths, respectively;

extracting a topic that commonly appears in the plurality of documents based on the thematic hierarchies recognized; and taking out a description part corresponding to the topic extracted from each of the plurality documents and outputting the description parts taken out as related passages among said plurality of documents, wherein regarding a topic set that comprises topics of various grading in the thematic hierarchies recognized, a relevance score between topics of the topic set based on lexical similarity of description parts corresponding to each topic of the topic set is calculated, and a topic set having a relevance score equal to or more than a threshold that is set based on inclusive relationship of topics is extracted, and the threshold, corresponding to any topic among topics which constitutes a target extraction of topic set, is a maximum value of calculated relevance score related to a topic which is included in a subtree in thematic hierarchies.

10. A document presenting method of presenting a plurality of documents designated as reading documents by a user, comprising:

recognizing a thematic hierarchy of each of the plurality of documents:

by repeating a process for detecting a set of thematic boundaries in each layer of the thematic hierarchy, with each of a plurality of different window widths, wherein each of the thematic boundaries is detected based on a lexical cohesion score obtained from a similarity of vocabularies that appear in two adjacent windows with each of the window widths at each location in each of the plurality of documents, and by correlating first and second thematic boundaries locating closely and detected with smaller and larger window widths, respectively;

extracting a topic that commonly appears in the plurality of documents based on the thematic hierarchies recognized; and taking out a description part corresponding to the topic extracted from each of the plurality documents and outputting the description parts taken out as related passages among said plurality of documents, wherein regarding a topic set that comprises topics of various grading in the thematic hierarchies recognized, a relevance score between topics of the topic set based on lexical similarity of description parts corresponding to each topic of the topic set is calculated, by a processor, and a topic set having a relevance score equal to or more than a threshold that is set based on inclusive relationship of topics is extracted, and the threshold, corresponding to any topic among topics which constitutes a target extraction of topic set, is a maximum value of calculated relevance score related to a topic which is included in a subtree in thematic hierarchies.

11. A document reading apparatus presenting a plurality of documents designated as reading documents by a user, comprising:

thematic hierarchy recognizing means for recognizing a thematic hierarchy of each of the plurality of documents:
- by repeating a process for detecting a set of thematic boundaries in each layer of the thematic hierarchy, with each of a plurality of different window widths, wherein each of the thematic boundaries is detected based on a lexical cohesion score obtained from a similarity of vocabularies that appear in two adjacent windows with each of the window widths at each location in each of the plurality of documents; and
- by correlating first and second thematic boundaries locating closely and detected with smaller and larger window widths, respectively;

topic extracting means for extracting a topic that commonly appears in the plurality of documents based on the thematic hierarchies recognized; and topic relation presenting means for taking out a description part corresponding to the topic extracted from each of the plurality documents and outputting the description parts taken out as related passages among said plurality of documents, wherein regarding a topic set that comprises topics of various grading in the thematic hierarchies recognized, a relevance score between topics of the topic set based on lexical similarity of description parts corresponding to each topic of the topic set is calculated, and a topic set having a relevance score equal to or more than a threshold that is set based on inclusive relationship of topics is extracted, and the threshold, corresponding to any topic among topics which constitutes a target extraction of topic set, is a maximum value of calculated relevance score related to a topic which is included in a subtree in thematic hierarchies.

* * * * *